(12) United States Patent
Lam et al.

(10) Patent No.: US 9,646,152 B2
(45) Date of Patent: May 9, 2017

(54) MULTI-PROFILE MOBILE DEVICE INTERFACE FOR SAME USER

(71) Applicant: Good Technology Holdings Limited, Waterloo (CA)

(72) Inventors: Wing Young Lam, Markham (CA); Chun Fung Yuen, Mississauga (CA); Richard Segal, Toronto (CA)

(73) Assignee: Good Technology Holdings Limited, Waterloo, Ontario (CA)

( * ) Notice: Subject to any disclaimer, the term of this patent is extended or adjusted under 35 U.S.C. 154(b) by 0 days.

(21) Appl. No.: 14/977,531

(22) Filed: Dec. 21, 2015

(65) Prior Publication Data
US 2016/0110538 A1   Apr. 21, 2016

Related U.S. Application Data

(63) Continuation of application No. 13/896,543, filed on May 17, 2013, now abandoned.

(51) Int. Cl.

| | |
|---|---|
| *G06F 21/45* | (2013.01) |
| *G06F 21/62* | (2013.01) |
| *H04W 12/08* | (2009.01) |
| *H04M 1/725* | (2006.01) |
| *H04L 12/58* | (2006.01) |
| *H04L 29/06* | (2006.01) |
| *H04L 29/08* | (2006.01) |
| *H04W 88/02* | (2009.01) |

(52) U.S. Cl.
CPC .......... *G06F 21/45* (2013.01); *G06F 21/629* (2013.01); *H04L 51/046* (2013.01); *H04L 63/083* (2013.01); *H04L 67/303* (2013.01); *H04M 1/72569* (2013.01); *H04W 12/08* (2013.01); *H04W 88/02* (2013.01)

(58) Field of Classification Search
CPC ............................. G06F 21/629; G06F 21/31
USPC .......................................................... 726/19
See application file for complete search history.

(56) References Cited

U.S. PATENT DOCUMENTS

| | | | |
|---|---|---|---|
| 2013/0145278 A1* | 6/2013 | Newell | ............... G06F 9/45545 715/738 |
| 2013/0145448 A1 | 6/2013 | Newell | |
| 2013/0159417 A1* | 6/2013 | Meckler | ................. H04L 67/22 709/204 |

* cited by examiner

*Primary Examiner* — Baotran N To
(74) *Attorney, Agent, or Firm* — Fish & Richardson P.C.

(57) ABSTRACT

A multi-environment computer device configured for providing a work environment type and a personal environment type via a user interface for a device user, each of the environments having the same persona, the device having: a computer processor coupled to a memory, wherein the computer processor is programmed to coordinate interaction between the device user and the pair of environments presented on the user interface by: configuring the user interface to present the personal environment for facilitating interaction between the device user and personal applications associated with the personal environment, the personal environment having an assigned user name of said persona and a personal password, the personal environment presented using a set of unique personal environment user interface design elements for distinguishing the personal environment from the work environment via the user interface; and responding to a switch environment command generated by a switch mechanism invoked by the device user via the user interface to replace the personal environment with the work environment on the user interface.

16 Claims, 16 Drawing Sheets

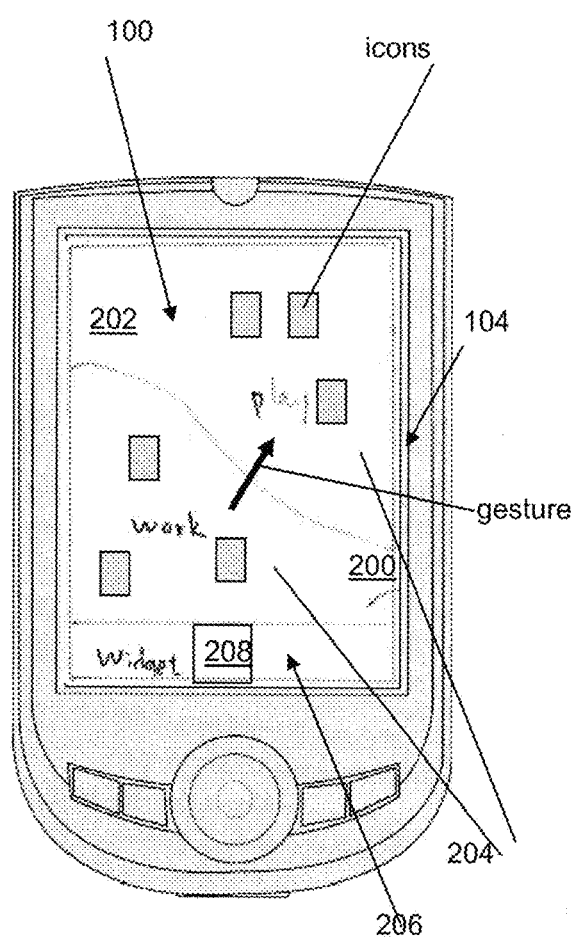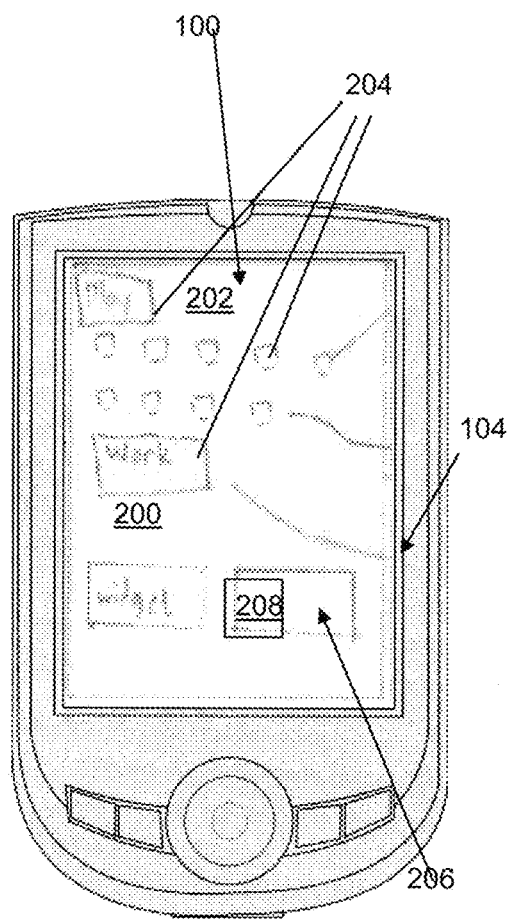
Figure 3e                    Figure 3f

MULTI-PROFILE MOBILE DEVICE INTERFACE FOR SAME USER

CROSS-REFERENCE TO RELATED APPLICATIONS

This application is a continuation under 35 U.S.C. §120 of U.S. patent application Ser. No. 13/896,543, filed May 17, 2013, the contents of which are incorporated herein by reference in their entirety.

BACKGROUND OF THE INVENTION

Bring-your-own-device (BYOD) trends are accelerating in today's everything-mobile environment. One disadvantage for today's users is that they have to carry multiple devices to stay connected to every aspect of their lives. The advent of consumerization has led employees to demand a greater say in the devices, applications and carriers they use at work. They either tend to regard company-issued mobile phones as their own, or they are looking to bring personal devices into the workplace to help them manage their day—but few are prepared to juggle two separate handsets nowadays. IT departments are struggling to react to the pace of change that these new types of hardware and operating systems pose in the enterprise environment. Data security is a particular concern as currently devices are used interchangeably for private and professional purposes, without proper restrictions placed on data access both on and off the device. At the moment, the frontier between personal and business devices is blurred, while smart phones are increasingly used for work purposes.

More specifically, a growing number of employees are already using their own phones for work-related activities. According to Forrester, 60% of companies now allow their employees to use personal smart phones and tablets at work a trend known as BYOD—"Bring Your Own Device." However, using the same device for work and private purposes may be problematic. For instance, using your business phone to store your personal contacts means that these may end up in the company's backup base, raising privacy concerns. Further, having company data on a personal device raises the likelihood that dissemination of the company data outside of company communication channels may occur.

Current interest is now in dual profile enabled mobile devices. Companies can benefit from cost savings of a "bring your own device" (BYOD) policy and data security, and employees can enjoy a greater degree of freedom over the choice of mobile device for work use without compromising personal data privacy or restricting usage. However, current state of the art makes these dual profile enabled mobile devices cumbersome to use and operate effectively, both from a user interface perspective as well as from a device configuration perspective, including the requirement to have multiple personas for security reasons.

SUMMARY

It is an object of the present invention is to provide a multi-environment device and method to obviate or mitigate at least one of the above-presented disadvantages.

Using the same device for work and private purposes may be problematic. For instance, using your business phone to store your personal contacts means that these may end up in the company's backup base, raising privacy concerns. Further, having company data on a personal device raises the likelihood that dissemination of the company data outside of company communication channels may occur. Current state of the art makes these dual profile or dual persona enabled mobile devices cumbersome to use and operate effectively, both from a user interface perspective as well as from a device configuration perspective. Desired are dual persona enabled devices that provide a hermetic frontier between the two work and personal profiles, while allowing users to switch very easily between the profiles. Also desired is the ability to receive both work and personal notifications within both profiles.

According to a first aspect is provided a multi-environment computer device configured for providing a work environment type and a personal environment type via a user interface for a device user, each of the environments having the same persona, the device having: a computer processor coupled to a memory, wherein the computer processor is programmed to coordinate interaction between the device user and the pair of environments presented on the user interface by: configuring the user interface to present the personal environment for facilitating interaction between the device user and personal applications associated with the personal environment, the personal environment having an assigned user name of said persona and a personal password, the personal environment presented using a set of unique personal environment user interface design elements for distinguishing the personal environment from the work environment via the user interface; and responding to a switch environment command generated by a switch mechanism invoked by the device user via the user interface to replace the personal environment with the work environment on the user interface by: presenting an intermediate login interface on the user interface; authorizing login to the work environment based on the assigned user name of said persona and an accepted work password entered by the device user, the work password different from the personal password; and configuring the user interface to present the work environment for facilitating interaction between the device user and work applications associated with the work environment, the work environment having the assigned user name of said persona and the work password, the work environment presented using a set of unique work environment user interface design elements for distinguishing the work environment from the personal environment via the user interface.

Further, coordination of interaction between the device user and the pair of environments presented on the user interface is provided by presenting a notification menu on the user interface for containing work environment notification type and personal environment notification type, such that a notification presented in the notification menu is configured by a notification manager to withhold presentation of notification content of the notification if the environment notification type does not match the environment type.

A further aspect provided is a method for providing multi-environments on a computer device including a work environment type and a personal environment type, each of the environments having the same persona, the method comprising a set of stored instructions for execution by a compute processor for: configuring a user interface of the computer device to present the personal environment for facilitating interaction between the device user and personal applications associated with the personal environment, the personal environment having an assigned user name of said persona and a personal password, the personal environment presented using a set of unique personal environment user interface design elements for distinguishing the personal environment from the work environment via the user interface; and responding to a switch environment command generated by a switch mechanism invoked by the device user via the user interface to replace the personal environment with the work environment on the user interface by: presenting an intermediate login interface on the user interface; authorizing login to the work environment based on the assigned user name of said persona and an accepted work password entered by the device user, the work password different from the personal password; and configuring the user interface to present the work environment for facilitating interaction between the device user and work applications associated with the work environment, the work environment having the assigned user name of said persona and the work password, the work environment presented using a set of unique work environment user interface design elements for distinguishing the work environment from the personal environment via the user interface.

BRIEF DESCRIPTION OF THE DRAWINGS

Exemplary embodiments of the invention will now be described in conjunction with the following drawings, by way of example only, in which.

DETAILED DESCRIPTION OF CERTAIN INVENTIVE EMBODIMENTS

Environments of Device 10

Figure 1:
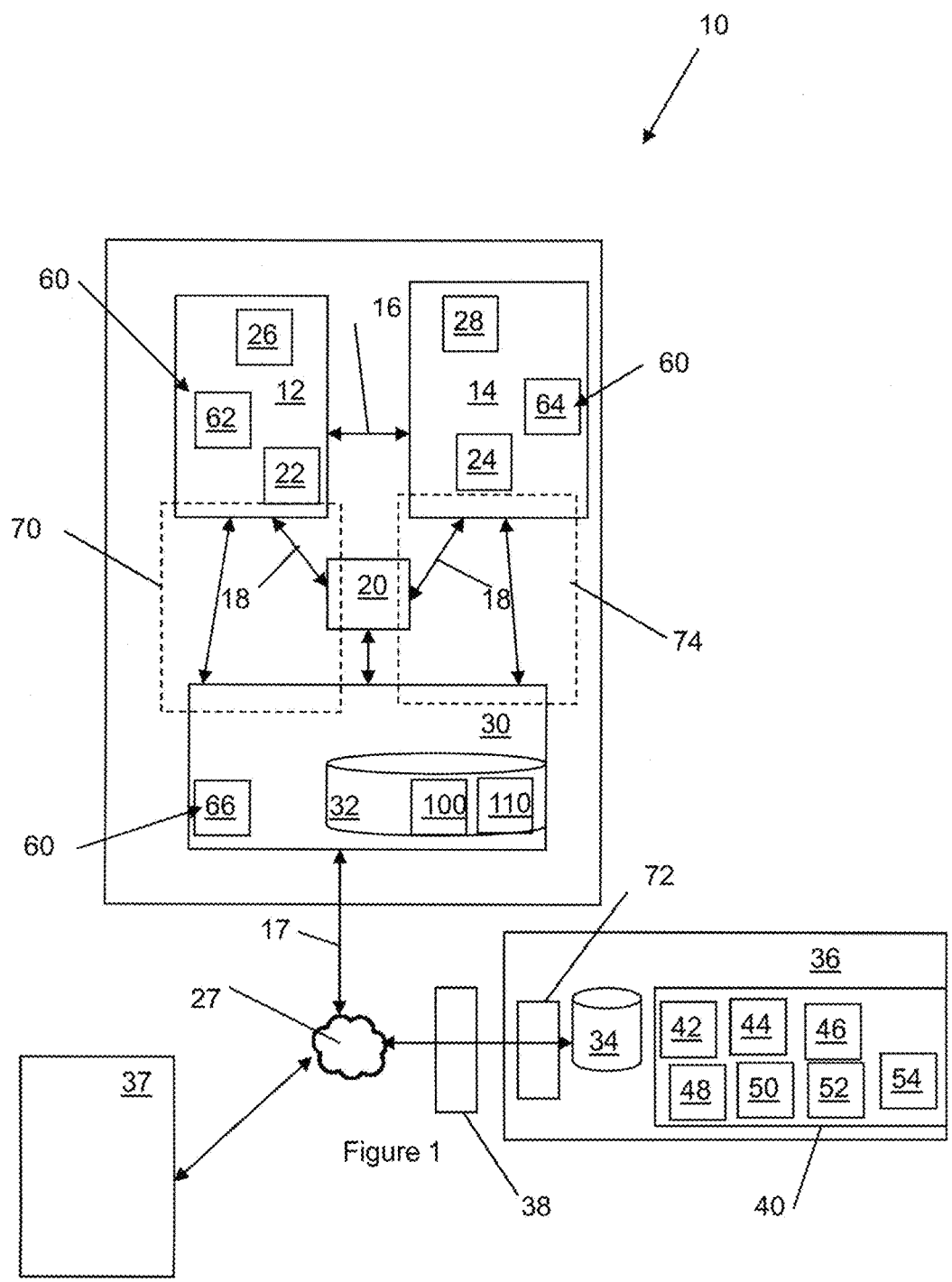
FIG. 1 is a block diagram of a dual persona for multiple environments of mobile device.

The claimed invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the claimed invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the claimed invention is provided below along with accompanying figures that illustrate the principles of the invention. The claimed invention is described in connection with such embodiments, but the claimed invention is not limited to any embodiment. The scope of the claimed invention is limited only by the claims and the claimed invention encompasses numerous alternatives, modifications and equivalents. Numerous specific details are set forth in the following description in order to provide a thorough understanding of the claimed invention. These details are provided for the purpose of example and the invention may be practiced according to the claims without some or all of these specific details. For the purpose of clarity, technical material that is known in the technical fields related to the claimed invention has not been described in detail so that the claimed invention is not unnecessarily obscured.

In practical terms, a dual persona of dual profile mobile device 10 (e.g. smart phone) creates two interfaces on the device 10, —a corporate one, controlled by the employer or enterprise of the device user, and a private one which is independent from the corporate one and typically cannot be accessed by the corporate enterprise. The real world is that individual device 10 end users have multiple relationships, but primarily their job/work relationship and their personal relationships. So, the concept of having two separate sets of usage controls within a single mobile device, better known as "dual persona," is advantageous, providing capabilities that employees (e.g. device 10 users) want to use for personal and work related purposes. As discussed further below, each of the separate environments 12, 14 (e.g., profiles) configured on the device 10 could have the same user name, thereby facilitating only the use of a password for login from one of the environments 12, 14 to another of the environments 12, 14 when the user switches between environments 12, 14 as displayed/configured on a user interface (e.g. touch screen) of the device 10. As further described below, switching between environments 12, 14 can be facilitated via use of a predefined gesture inputted to the user interface of the device 10 by the device user.

Referring to FIG. 1, a dual persona mobile device 10 is segregated for combined personal and work use by providing a pair of environments as a secure work application environment 12 and a personal application environment 14 provisioned on the device 10, while at the same time providing for access to either environment 12, 14 via a user interface 104 (see FIG. 2) of the device 10, using an example environment initial access or switch visual interface 100 of dual display portions 200,202 on the user interface 104, as further described below. The separate application environments 12, 14 can have limited communication 16 directly with one another (e.g. for notification purposes) and/or can have indirect communication 18 with one another through an intermediate device manager 20. These limited communications 16, 18 can be for the purposes of notifications, as further described below. As such, the exchange of sensitive work data 22 and sensitive personal data 24 can be inhibited between the two discrete profiles provided by the environments 12, 14, thereby helping to provide safeguarding for both corporate work information privacy and the device 10 user's personal information privacy. A work profile manager 26 and a personal profile manager 28 can be used to manage the individual respective environments 12, 14, and as such can be in communication 16 with one another, in communication 18 with the intermediate device manager 20, and/or in communication with common device platform 30 of hardware components and capabilities/software configuration (e.g. camera, network interface 99 (see FIG. 11), graphical user interface GUI, etc. device sensors, GPS, etc.). The user interface 104 is a component of the common device platform 30, which is available for use by either environment 12, 14, including memory 32.

In summary, the multi-environment computer device 10 can be configured for providing the work environment 12 type and the personal environment 14 type via the user interface 104 for interaction with a device user, such that each of the environments 12, 14 has the same persona. The device user interface 104 can be configured by: configuring to present the personal environment 14 for facilitating interaction between the device user and personal applications associated with the personal environment 14, the personal environment 14 having an assigned user name of the persona and a personal password, the personal environment 14 presented using a set of unique personal environment user interface design elements for distinguishing the personal environment 14 from the work environment 12 via the user interface 104.

Upon desire of switching environments 12, 14, this can be accomplished by the computer device 10 configured to respond to a switch environment command generated by a switch mechanism invoked by the device user via the user interface 104 to replace the personal environment 14 with the work environment 12 on the user interface 104 by: presenting an intermediate login interface on the user interface 104; authorizing login to the work environment 12 based on the assigned user name of the persona and an accepted work password entered by the device user, the work password different from the personal password; and configuring the user interface 104 to present the work environment 12 for facilitating interaction between the device user and work applications associated with the work environment 12, the work environment 12 having the assigned user name of the persona and the work password, the work environment 12 presented using a set of unique work environment user interface design elements for distinguishing the work environment 12 from the personal environment 14 via the user interface 104.

Alternatively, in the case where the user interface 104 is configured initially as the work environment 12, the multi-environment computer device 10 can be configured for providing the personal environment 14 type via the user interface 104 for interaction with a device user, such that each of the environments 12, 14 has the same persona. The device user interface 104 can be configured by: configuring the computer device 10 to respond to a switch environment command generated by a switch mechanism invoked by the device user via the user interface 104 to replace the work environment 12 with the personal environment 14 on the user interface 104 by: presenting an optional intermediate login interface on the user interface 104; authorizing login to the personal environment 14 based on the assigned user name of the persona and an accepted work password (e.g. null or default password) entered by the device user, the personal password different from the work password; and configuring the user interface 104 to present the personal environment 14 for facilitating interaction between the device user and personal applications associated with the personal environment 14, the personal environment 14 having the assigned user name of the persona and the personal password (e.g. null), the personal environment 14 presented using a set of unique personal environment user interface design elements for distinguishing the personal environment 14 from the work environment 12 via the user interface 104.

As further discussed below in greater detail, using numerous different switch mechanism embodiments, the switch mechanism can be implemented on the computer device 10 using interaction by the device user with a predefined graphical element displayed on a display of the user interface 104. The interaction with the predefined graphical element can be configured via one or more of the managers to generate a switch environment command based on the predefined gesture. For example, the predefined gesture can be a finger based gesture associated with the predefined graphical element.

As further discussed below, the environments 12, 14 can be more than just a pair of environments (e.g. one work and one play). For example, the environments could include multiple different work environments 12 and/or multiple different play environments 14. One example of this is the device 10 configured to have one play environment 14 and multiple different work environments 12, such that each different work environment 12 could be configured with a different respective user password used by the device user for selected work environment 12 login. As discussed above, each of the multiple environments 12, 14 could be assigned the same user name as part of the login feature, thus providing for user login with the same user name but with different passwords associated with each of the different environments 12, 14. It is recognized that certain environments 12, 14 (e.g. play environment) could have a default password as a null or no password requirement. Examples of password types can include alpha-numeric strings, biometric data (e.g. fingerprint, retina scan, facial recognition), and/or unique gesture based passwords (e.g. tracing of predefined patterns on the user interface). Other password types can be what is referred to as an air gesture, whereby the user provides a predetermined motion or gesture (e.g. hand swipe), without touching the screen of the user interface 104, which is captured by the camera or other imager of the device 10 and then recognized by the manager(s) as a predefined password command or instruction to initiate the switch of environments 12, 14. As such, the individual password types can be used alone or in combination to provide for the requisite password used to switch from one environment 12, 14 to another environment 12, 14.

Figure 2:
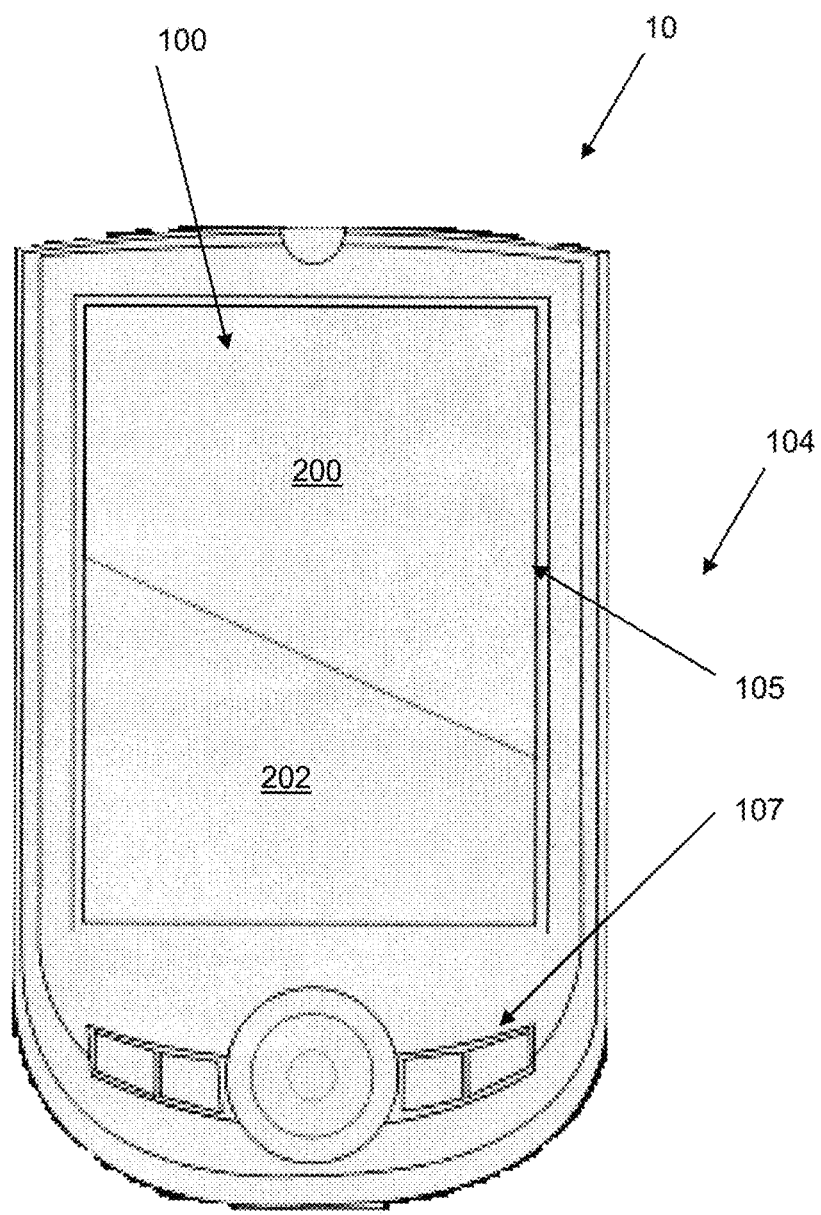
FIG. 2 is a block diagram showing an example configuration of a user interface of the device of FIG. 1.

Referring to FIGS. 1 and 2, the user interface 104 provides for implementation via the managers 20, 26, 28 of displaying dedicated Work and Personal/Play environments or zones 12, 14 on the device 10. The Work and Personal/Play environments or zones 12, 14 can be configured as two or more distinctly separate zones/containers on the device 10, which provide individual security of data access/storage and network 27 communication when the device user interface 104 is configured as a device for work or as a device for play/personal. Communication messages 17 over the network 27 can be directed between the device 10 when operating in the work environment 12 to work related remote computer devices 36 and can be directed between the device 10 when operating in the personal environment 14 to personal related remote computer devices 37.

User Interface 104

The environments 12, 14 (also referred to as zones or profiles interchangeably) each have distinctive design elements (e.g. visual elements) displayed on the user interface 104 that are visually different and graphically unique and appealing to the device 10 user, so that the design elements (e.g. visual elements) are recognizable and associated by the user as either representing a particular environment 12, 14 (e.g. the work environment 12 or the personal environment 14) but not both at the same time. It is recognized that in the case of multiple work environments 12 (in addition to one or more play environments 14), each environment 12, 14 of the environment set can have distinctive design elements (e.g. visual elements) displayed on the user interface 104 that are visually different and graphically unique and appealing to the device 10 user, so that the design elements (e.g. visual elements) are recognizable and associated by the user as either representing a particular environment 12, 14 of the environment set.

For example, but not limited to, "Work" design elements (e.g. visual elements) of the work environment 12 on the user interface 104 can be represented using a common work visual theme of a metallic/dark color/conservative look & feel, (e.g. resembling like a bank vault or other corporate look), using defense grade NSA/CIA/Dept of Defense data and communication protection, passwords and encryption technology. "Play" or personal of the personal environment 14 on the user interface 104 can be represented using a common work visual theme of a vivid/bright color/modern look for & feel for "Play" (e.g. like a lifestyle companion, with simple & easy to use scrollable widgets, larger graphical buttons/font and configured application short cuts).

It is also recognized that audio aspects of the user interface 104 can be configured for distinctive recognition as representing either the work environment 12 or the personal environment 14. The environments 12, 14 can each have distinctive design elements (e.g. audio elements) generated by the user interface 104 that are audibly different and unique and appealing to the device 10 user, so that the design elements (e.g. audio elements) are recognizable and associated by the user as either representing the different work environment 12 and/or personal environment 14 but not two or more environments 12, 14 at the same time. Examples of the audio elements can include sounds such as but not limited to: individual ring tones recognized as either for work or for play; keystroke sounds configured to be recognized as either for work or for play; and/or application sounds associated with certain application functions (e.g. open/close screens, error tones, etc.) configured to be recognized as either for work or for play respective environment types present in the multi-environment set (i.e. two or more predefined environments 12, 14).

As further discussed below in relation to FIG. 2, the ability of the device 10 user to effortlessly access (e.g. initially or when switching between environments 12, 14) either the work environment 12 or the personal environment 14, as well as to retain a contextual understanding (i.e. current user perception) of which environment 12, 14 the user is currently operating within, is important. The device 10 of FIG. 2 has a user interface 104 (e.g. including a display screen 105 such as a touch screen and/or mechanical input devices 107—e.g. buttons, knobs, etc. and optional speaker 109), which is the space/mechanism where interaction between the user and the device 10 occurs. The goal of interaction between the user and the device 10 at the user interface 104 is effective operation and control of the device 10 (and/or application 40, 60 functionality provided by the device 10) and feedback from the device 10 which aids the user in making operational and/or application decisions. In order to provide for the access and maintaining context of the current environment 12, 14 in use by the user, the display screen 105 is configured to display both a dedicated work environment display portion 200 (e.g. icon) and a personal environment display portion 202 (e.g. icon) It is recognized that each of the dedicated display portions 200, 202 can be distinguished by the user as representing one of the environments 12, 14 but not more than one of the environments in the multi-environment set.

One example format of the display portion 200,202 is an icon that uniquely represents its respective environment 12, 14 due to a visual feature (e.g. shape, shade, pattern and/or color) that is different from the visual feature of the icon representing another environment 12, 14 (e.g. use of first icons for one environment 12, 14 and second icons for another environment 12, 14, such that the first and second icons are unique with respect to one another). Another example format of the display portion 200,202 is an environment graphical element format that uniquely represents its respective environment 12, 14 due to a visual feature (e.g. shape, size, shade, pattern and/or color) of the graphical element that is different from the visual feature of the graphical element representing another environment 12, 14 (e.g. use of first visual feature for one environment 12, 14 and second visual feature for another environment 12, 14, such that the first and second visual features are unique with respect to one another). A further example of this graphical element is font, such that font in one environment 12, 14 has one or more different visual features (e.g. style, shape, size, shade, pattern and/or color) than the font in the other environment 12, 14 (e.g. use of first font for one environment 12, 14 and second font for another environment 12, 14, such that the first and second fonts are unique with respect to one another). Another example of this graphical element is background, such that background in one environment 12, 14 has one or more different visual features (e.g. style, shape, size, shade, pattern and/or color) than the background in the other environment 12, 14 (e.g. use of first background for one environment 12, 14 and second background for another environment 12, 14, such that the first and second backgrounds are unique with respect to one another). Another example format of the display portion 200,202 is a specified predefined screen location, such that location of a visual element in this location is indicative of an active control to switch between the current environment 12, 14 with the other environment 12, 14 or otherwise log in to the respective environment 12, 14 associated with the predefined screen location (e.g. use of first location for one environment 12, 14 and second location for another environment 12, 14, such that the first and second locations are unique with respect to one another). In any event, it is recognized that predefined gestures can be used (as configured by the user interface 104) to be associated with implementing a switch between one of the environments 12, 14 to another environment 12, 14 in the multi-environment set.

Other example formats of the display portions 200,202 can be different and uniquely recognizable color tone; graphics; icons; images design; backgrounds or wallpapers, device start-up animation differences for Work/Play; overall individual pages/screen design for Work/Play; unique Font Type selections for Work/Play; and/or unique Alert tones for Work/Play, such that use of first format for one environment 12, 14 and second format for the another environment 12, 14, such that the first and second formats are unique with respect to one another. The first and second formats can be used to represent one or more visual elements of the environments 12, 14. The first and second formats can be used to represent one or more audio elements of the environments 12, 14.

Device Common Platform 30

In terms of the common device platform 30 used to support the user interface 104, data access/storage and network 27 communication, it is recognized that the device hardware components and capabilities can include two or more network interfaces (e.g. including individual SIM cards) for use in segregating network 27 communications of the work application environment 12 and the personal application environment 14, as desired. GSM feature devices 10 can use a small microchip called a Subscriber Identity Module or SIM Card, to function (e.g. removable hardware User Identity Module). The SIM securely stores the service-subscriber key (IMSI) and the Ki used to identify and authenticate the user of the mobile device 10 when communicating over the network 27. The SIM card can provide for users to change or swap profiles by simply removing (or switching over in the case of dual SIM enabled devices 10) the SIM card from the mobile device 10 and inserting another into the mobile device 10.

In terms of data 22, 24 storage, the device 10 can have a local storage 32 (e.g. one or more on-board memories—for example one or more memory cards) and/or a remote storage 34 (for example one or more remote storages) that can be administered by a remote computer device 36 (e.g. a cloud server or enterprise server providing cloud based or enterprise based storage of device data 22, 24 off-board the device 10. For example, the remote computer device 36 can provide cloud-based management of the work persona 12 on the device 10, from security and email settings, through to which applications 60 are installed in the memory 32 of the device components 30.

As shown, for example, behind an enterprise firewall and secure access gateway 38, the remote computer device 36 can be provided as a secure enterprise mobile services gateway/server in communication with the device 10 over an enterprise network (e.g. Virtual Private Network (VPN) established over the network 27). Preferably, the communications network 27 comprises a wide area network such as the Internet, however the network 27 may also comprise one or more local area networks 27, one or more wide area networks, or a combination thereof. Further, the network 27 need not be a land-based network, but instead may comprise a wireless network and/or a hybrid of a land-based network and a wireless network for enhanced communications flexibility.

In terms of communications on the network 27, these communications can be between computer devices (e.g. device 10 and device 36) consisting of addressable network packages following a network communication protocol (e.g. TCPIP), such that the communications can include application data 24 communicated using appropriate predefined encryption as used between the work application environment 12 and the secure enterprise mobile services gateway/server (e.g. remote computer device 36). As shown, the secure enterprise mobile services gateway server 36 can includes various enterprise hosted applications/functions 40, including, mobile email 42, mobile synchronization 44, mobile contacts 46, mobile calendar 48, mobile communications 50, mobile intranet 52 and other enterprise specific applications 54. In some embodiments, the secure enterprise mobile services gateway server 36 can provide access to various enterprise network intranet services.

In some embodiments, the enterprise mobile services provided by the enterprise hosted applications 40 can include applications such as but not limited to; email, contacts, calendar, enterprise communications, mobile device synchronization services, intranet internal web sites, internal enterprise applications, enterprise file systems, and/or other enterprise networking services. Other applications 40 can include secure mobile services application access, communication link provisioning (e.g., cryptographic encryption keys, VPN settings, and various other security/communication provisioning), security programs, service control programs, and program settings for enterprise service applications, such as email, calendar, contacts, mobile synchronization services, and traffic control. In some embodiments, secure enterprise mobile services gateway server 36 can provide optimized mobile application formatting of the enterprise information or synchronization application services 40 to synchronize the enterprise database 34 for the above services in an efficient and/or timely manner.

In general, application 40, 60 software, also known as an application or an app, is computer software designed to help the device 10 user to perform specific tasks or activities via the user interface of their device 10. An application 40, 60 can manipulate text, numbers, graphics, or a combination of these elements via the user interface of the device 10. Examples of application 40, 60 software include enterprise hosted software (e.g. addresses the needs of organization processes and data flow, often in a large distributed environment), accounting software, office suites, graphics software and media players. Applications may be bundled with the computer and its system software, or may be published separately. Application 40, 60 software is contrasted with system software and middleware (e.g. part of the device component and software system 30), which manage and integrate a computer's capabilities, but typically do not directly apply in the performance of tasks that benefit the user. The system software serves the application 40, 60, which in turn serves the user.

Functionality of Environments 12, 14

Referring again to FIG. 1, in some embodiments the end-user device 10 system can be in communication with one or more network system computer devices 36 via the network 27. As noted above, the device 10 can have a multi device software application environment comprising: (1) one or more enterprise work application execution environment 12 configured with: an enterprise application execution memory and data 22 memory provided by component 30 to support secure execution of enterprise software remote applications 40 (accessed via the network 27) and/or enterprise software local work applications 62, the enterprise software applications 40,62 comprising applications approved to execute or otherwise communicate in the secure execution work environment 12 and to communicate with secure enterprise services (provided by remote computer 36) via the work environment 12 (or otherwise managed by the work environment 12—for example the work environment manager 26). Also provided is a secure enterprise communication link either within the environment 12 or otherwise accessible by the work environment manager 26, in communication with the device manager 20 and/or directly with the device component environment 30 itself. The secure enterprise communication link can be configured to provide secure network 27 communication between the device 10 and the enterprise network services (e.g. the enterprise network services comprising enterprise network resources and servers 36).

The multi device software application environment of the device 10 also has (2) one or more personal application execution environment 14 configured with execution memory and data 24 memory provided by component 30 to support execution of personal software applications 64 not approved to execute in the secure execution work environment 12. However, it is recognized that communications 16,18 can be provided between the environments 12, 14, however preferably these communications 16,18 are provided as notifications/indications of respective data 22,24 present and accessible when the user is operating in the appropriate environment 12, 14. In this manner, sensitive application data is not communicated and made available in both two or more environments 12, 14, rather the sensitive application data (e.g. text body of email message) is retained in one of the environments 12, 14 (e.g. host environment) associated with the host application (of the host environment) for the application data while only the notification message indicating that an email message is available (e.g. notification message containing date and time of email but missing sender name and/or body content) in the other environment 12, 14 (i.e. other than the host environment) of the multi-environment set.

One example of these notification communications 16, 18 is where a personal email arrives via a personal email application 64 provisioned in the personal environment 14. If the user is at the time logged into their work environment 12, then the email application 64 (e.g. via the device manager 20) sends a notification message 18 to the corresponding work email application 62 provisioned in the work environment 12, such that the notification message 18 content only provides an indication that a personal email has arrived and withholds the actual data 24 content of the personal email, such that the actual data 24 content can only be accessed subsequently if the user changes environments 12, 14 and logs in to the personal environment 14 and opens the personal email via the personal email application 64. Alternatively, the notification communications 16, 18 can be a work email arriving via the work email application 62 provisioned in the work environment 12. If the user is at the time logged into their personal environment 14, then the email application 62 (e.g. via the device manager 20) sends the notification message 18 to the corresponding personal email application 64 provisioned in the personal environment 14, such that the notification message 18 only provides an indication that a work email has arrived and withholds the actual data 22 content of the work email, which can only be accessed subsequently if the user logs in to the work environment 12 and opens the work email via the work email application 62. Accordingly, in general, if the user is at the time logged into their first environment 12, 14, then the provisioned application 60 of the first environment 12, 14 (e.g. via the device manager 20) sends the notification message 18 to the corresponding application 60 provisioned in the second environment 12, 14, such that the notification message 18 only provides an indication that a communication (e.g. email, phone call, voicemail, text, etc.) has arrived and withholds the actual data 22,24 content of the communication, which can only be accessed subsequently if the user switches from the first environment 12, 14 to the second environment 12, 14 by logging in to the second environment 12, 14 and access the communication via the second environment application 60.

Alternatively, instead of application 60 to application 64 communications, the host application in the host environment (i.e. the application initially receiving a message (e.g. email) can communicate the presence of the received message (e.g. withholding the message body content and/or sender name) as the notification message to an intermediate notification menu, as further described below. This configuration can be advantageous in device configurations where applications 60, 64 from one environment 12, 14 may not have a common communication protocol (e.g. interface such as an API and/or the proper security credentials in place) to directly communicate with one another.

Device Applications 60

With "Work/play", device 10 users can load the work environment 12 with their applications 62 of, for example, corporate emails, corporate address books, work calendars, and other enterprise applications. While for the personal environment 14, users can load with their applications 64 of, for example, their personal favorite games, apps, and music. Use of the different environments 12, 14, via the managers 20, 26, 28, provides for the users the ability to switch between work and play environments 12, 14 with ease, as further described below. Accordingly, the configuration of the environments 12, 14, including their initial access by the user (e.g. device sign-on), use of applications 40, 60 when within the environments 12, 14, as well as when switching between environments 12, 14, provides the user with "Work/play" separates that helps to safeguard sensitive business data 22 on the device 10, as well as to help keep personal data 24 separated from the work data 22. The environments 12, 14 are used to on the device 10, in conjunction with the common platform 30, to create distinct modes, Work mode(s) and Play mode(s), which is apart from the undesirable and typical combined operations on today's smart phones that can compromise user friendliness against security in daily life.

For example, in terms of the personal environment 14, this provides the user with a personal mode, such that when not working, users can access and use their personal applications 64 (with associated data access/storage and network 27 communication ability provided via the common platform 30 components assigned to the personal environment 14) to send messages to friends, watch multimedia content, share picture albums, play games, enjoy social media and sharing, browse internet and access to their favorite apps. Personal activities remain separate from business responsibilities, as administered by the manager 28 of the environment 14 in conjunction (where/when used) with the manager 26 and manager 20.

In terms of the work environment 12, this provides the user with a Work mode such that when not doing personal things, users can access and use their work applications 62 (with associated data access/storage and network 27 communication ability provided via the common platform 30 components assigned to the work environment 12) to focus on business by entering the work environment 12, where they can access corporate email, calendars, latest company bulletins/news, sensitive reports, documents and presentations just like on a company sanctioned "work only" device.

Also envisioned in the case where there are two or more work environments 12 in the multi-environment set, this provides the user with a first Work mode such that when not doing work modes things from a second work mode, users can access and use their work applications 62 (with associated data access/storage and network 27 communication ability provided via the common platform 30 components assigned to the work environment 12) of the first work mode to focus on business by entering the work environment 12 associated with the first work mode, where they can access corporate email, calendars, latest company bulletins/news, sensitive reports, documents and presentations just like on a company sanctioned first mode "work only" device. In this manner, different work modes on the same device 12 can remain separate from one another. For example, a corporate work environment 12 can be maintained as a separate environment 12, 14 by the managers 20, 26, 28 from a second work environment 12 (e.g. personal business activities—for example home business) that is not associated with corporate business activities of the first corporate work environment 12.

Examples of work applications 62 for each of one or more work environments 12 of the multi-environment set can include applications such as but not limited to: Corporate/Work Calendar; Corporate/Work Mail; Corporate/Work Directory and Address Book; Company News (e.g. RSS, XML, etc.); Instant Messaging (e.g. What's app, Skype, etc.); Job dispatcher, Tasks and to-do-list; Recorder for meeting; Notes; Storage, reports and documents (e.g. XLS, PPT, DOC, etc.); Stock prices; Secured network connectivity/connection manager; and Tariff and unbilled usage counter/widget (work) for a network 27 data/usage plan (e.g. as configured via the SIM card assigned to the work environment 12). Examples of work applications 62 can include applications such as but not limited to: Social Networking (e.g. Facebook, Blog, Twitter, Line, Sina, etc.); Multimedia recording, playback and sharing (e.g. video, audio, photo, music, etc.); Games and apps; Personal Alarm and tasks; Instant Messaging (e.g. Yahoo!, Google, What's app, MSN, Skype, etc.); Point of Interests, Navigation and Geo-fence (e.g. Map tools); My wallet (e.g. banking, statement, NFC payment, auction & bidding/taoboa, etc.); Storage and backup on 3Cloud; Utilities/Tools (e.g. stock, apps, widgets, calculator, weather, etc.); Tariff and unbilled usage counter/widget (personal) for a network 27 data/usage plan (e.g. as configured via the SIM card assigned to the personal environment 14). It is recognized that the same application 60 type (e.g. Microsoft Outlook) can be installed in multiple different instances, one instance as a work (e.g. Outlook) application 62 in the work environment 12 and as a personal (e.g. Outlook) application 64 in the personal environment 14. Alternatively this can be done as different instances in different environments 12, 14 of the same environment type (e.g. work or play types). In this manner, as discussed above, the managers 20, 26, 28 can facilitate notification messages 16, 18 between the applications 62, 64 in the different environments 12, 14.

Communication Between Devices 10, 36

In view of the above-described off-device enterprise managed and administers applications 40 (e.g. those applications having functionality that is access via the network 27 by the device 10 when in communication with the remote computer device 36), it is recognized that the device 10 can also have local applications 60. These local applications 60 (e.g. those having application functionality that is available locally on the device 10 without having to access the functionality off device 10 via the network 27) can be associated and therefore provisioned in the work environment 12 as work applications 62 (e.g. work calendar), associated and therefore provisioned in the personal environment 14 as personal applications 64 (e.g. personal games or personal calendar), and/or associated and therefore provisioned in the common device environment 30 as common applications 66 (e.g. camera application, phone application, shared user interface, etc.). Another way to think of difference between the applications 40 and 60 is that the applications 40 are configured as remotely hosted (i.e. off device) such that at least a portion of the functionality provided by the application 40 is accessed via the network 27 in a client-server relationship between the device 10 and the device 36 (e.g. represented as a server). This is compared to the applications 60 which are configured as locally hosted (i.e. on device), such that application 60 functionality can be used by the device user without having to communicate via the network 27 during access of the functionality.

In terms of network communication messages 17 between the device 10 and one or more networked entities (e.g. device 36 such as servers, other mobile devices 10 in communication with one another that each have respective work environments 12 provisioned on the device 10) on the network 27 that are associated with the work environment applications 62, the communication messages 17 can be communicated via the secure mobile work environment 12 and associated secure network interface(s) 70 (provided either within the secure mobile work environment 12 and/or provided as part of the common platform 30 included in device 10). Also, a work secure network interface 72 is included as part of the remote computer device 36 accessed via the network 27, which is configured to communicate with the secure network interface 70. For example, the secure network interface 72 can be provisioned on the remote computer device 36 acting as a work related cloud server or enterprise server. In another example, the secure network interface 72 can be provisioned on the remote computer device 36 acting as another mobile device 10 and therefore the secure network interface 72 could be the secure network interface(s) 70 associated with the work environment 12 of the device 10. As discussed above, in some embodiments, the work environment 120 provides for protection of sensitive enterprise (e.g. work related) information (e.g. data 22) that is stored on device 10 (e.g., email text and downloads, calendar information, contacts, intranet data, or any other enterprise data) and provides a secure communication channel via the network interface 70 to facilitate authentication with server secure network interface 72 on the remote computer 36 (e.g. acting as a secure enterprise mobile services gateway/server or as a plurality of different servers).

In some embodiments, the secure network interface 70 on device 10 can be configured with a Virtual Private Network (VPN) device client function to securely communicate between one or more approved enterprise (e.g. work related) applications 62 (e.g., enterprise data app, enterprise voice app, secure enterprise mobile services app) and a counterpart VPN function that secures access to enterprise network interface 72 (e.g., enterprise firewall/security gateway or server secure network interface). In some embodiments, a device software application or agent (e.g. one of the work applications 62 such as a service processor framework program, service processor kernel program, secure network interface 70, secure hardware partition manager 108) is configured to identify network access activity associated with individual applications 40,60 and allow network access to one or more approved enterprise applications 40 when the VPN device client function is in operation, or not allow network access to one or more approved enterprise applications 40 when the VPN device client function is not in operation. The device software application or agent can be provisioned with application access policy rules to identify network access activity associated with individual applications and allow network access to one or more approved enterprise applications 40 when the VPN device client function is in operation, or not allow network access to one or more approved enterprise applications 40 when the VPN device client function is not in operation. Alternatively, in some embodiments, the secure network interface 70 can be configured with a split-tunnel VPN device client function, wherein an enterprise side (e.g. of remote computer device 36) of the split tunnel is configured to securely communicate between one or more enterprise applications 40 and a counterpart VPN function that secures access to the enterprise network interface 72.

Also considered is a consumer side network interface 74 configured to communicate without encryption for access to network services provided to consumer applications 64 provisioned/hosted on the device 10. The consumer side network interface 74 can be provided either within the personal mobile work environment 14 and/or provided as part of the common platform 30 included in device 10. In any event, it is recognized that the consumer side network interface 74 is configured to interact with personal applications 64, personal data 24 and any personal related remote computer devices 36 (e.g. other mobile devices of friends, family—dual persona enables or not—that are interacting with any personal applications 64 provisioned on the device 10).

As such, it is recognized that access to the network 27 is controlled by the secure work network interface 70 when the user is interacting with the work environment 12 (and associated applications 62 and data 22). Conversely, access to the network 27 is controlled by the personal network interface 74 when the user is interacting with the personal environment 14 (and associated applications 64 and data 24). Operation of the manager(s) 20, 26, 28 provides for use of the appropriate network interface 70, 74, depending upon which of the environments 12, 14 the application 60 access, data 22, 24 access, and/or network communications 17 is intended. To be clear, the manger 26 and network interface 70 associated with the work environment 12 is configured as incompatible for access with applications 64, data 24, and/or network personal directed communications 17. To be clear, the manger 28 and network interface 74 associated with the personal environment 14 is configured as incompatible for access with applications 62, data 22, and/or network work directed communications 17.

Example User Interface 104 Formats for the Environments 12, 14

User Access Interface 100

Figure 3A:
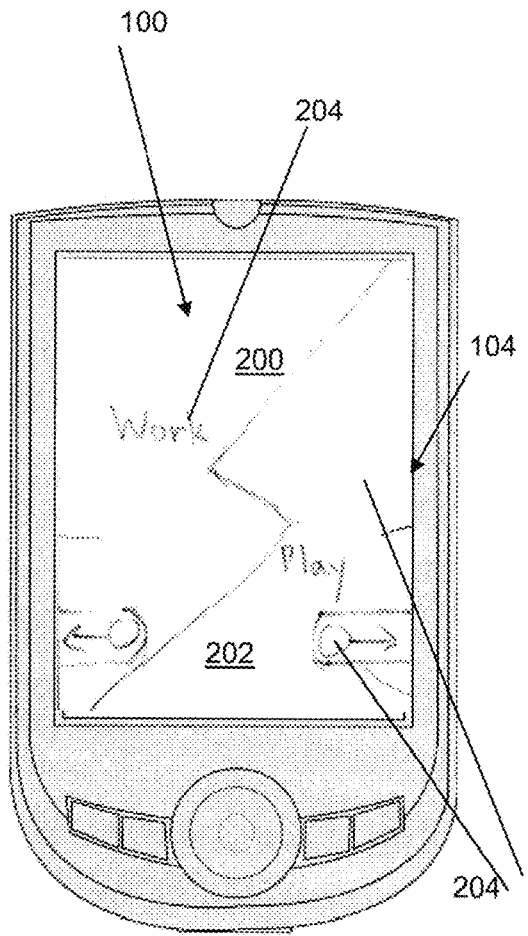
FIGS. 3a, b, c, d, e, f, g, h, i show alternative embodiments of a user access interface is an example interface of the scheduling coordination service of the user interface of the device of FIG. 2.

Referring to FIGS. 1 and 3*a,b,c,d*, the environment access interface 100 (as a visual interface) provides for the multi display portions 200,202 on the user interface 104, which are used to access either the work environment 12 or the personal environment 14. It is recognized that at least one of the managers 20, 26, 28 could be configured to display the environment access interface 100, which can be selected (e.g. by the user or by an administrator of the device environment 12, 14) from a plurality of different environment access interface 100 types during configuration of user access to the environment(s) 12, 14, as stored in the storage 32 of the common platform 30 of the device 10. This selection can be facilitated by a selection manager (e.g. configured as part of the functionality of the device manager 20). One characteristic of the environment access interface 100 is the respective different location predefined for each of the display portions 200,202, one for representing access to the work environment 12 and the other for representing access to the personal environment 14. As shown in FIGS. 3*a, b, c, d*, the work portion 200 is displayed in a different location from the play portion 202. A further characteristic of the environment access interface 100 is the unique visual graphical format (e.g. pattern, shading scheme, color scheme, font type/format, etc.) of graphical elements 204 (e.g. background, control items) in each of the respective display portions 200,202, such that each graphical format is different from one another so that the user can perceive one of the portions 200,202 as the work portion (and only the work portion) and the other of the portions 202 as the play portion (and only the play portion). An example of the graphical element 204 as a background would be where the background 204 in the work portion 200 could be monochrome in color while the background 204 in the work portion 200 could be a vibrant color (e.g. primary color). An example of the graphical element 204 as a text element would be where the text element 204 in the work portion 200 could be of block format in font style while the text element 204 in the work portion 200 could be script format in font style. In other words, the graphical format of graphical elements 204 in one of the portions 200,202 is distinct (e.g. different) from the graphical format of graphical elements 204 in the other of the portions 200,202.

The graphical elements 204 can be passive elements (e.g. such as static background schemes, etc.) or can be active elements. An active element, upon activation, issues a command to perform the function associated with the active element. For example, selection of an "X" active element issues the command (e.g. to the operating system) to close a display window associated with the "X" active element. It is recognized that the active elements can be associated with predefined gestures entered on the user interface 104 by the device 10 user. Predefined gestured entered into the user interface 104 can be referred to as a form of non-verbal communication in which visible or tactile bodily actions of the user can communicate particular messages, either in place of speech or together and in parallel with words. Gestures can include movement of the hands, face, or other parts of the body. Gestures can differ from physical non-verbal communication that does not communicate specific messages, such as purely expressive displays, proxemics, or displays of joint attention. The movement of gestures can be used to interact with technology like the devices 10, using touch or multi-touch elements of the user interface 104, physical movement detection via one or more sensors of the device 10 and visual motion capture.

In another example, selection and/or provision of the active element (e.g. as an icon and/or predefined gesture) would result in issuing a command to open the application associated with the active element. Graphical elements 204 (or other types) as active elements can be used as virtual controls, though which the user interacts with information (e.g. applications 40,60, data 22,24) by manipulating the active elements (e.g. visual widgets) that allow for interactions appropriate to the kind of data they hold. For example, large graphical elements 204, such as windows, can provide a frame or container for the main presentation content. Smaller graphical elements 204 can act as a user-input tool i.e. virtual control). The active elements can be defined by location on the environment access interface 100, such that if they are located in the work portion 200 then interaction with the active element by the user (e.g. predefined gesture, keys and/or clicks/touch on the specific graphical element 204 position) causes the defined action associated with the active element to be implemented for the work environment 12 (e.g. initial access to the work environment 12 and/or access to applications 60 and/or data 22 contained within the work environment 12). For example, selection/use of the active element (e.g. graphical element 204) in the work portion 200 indicates to the appropriate manager (e.g. device manager 20 acting as an environment 12, 14 access manager) that the user wishes to enter and access one or more applications 62 associated with the particular work environment 12, which can include the display of an intermediate log-in interface 110 (see FIG. 4). Alternatively, selection/use of the active element (e.g. graphical element 204) in the play portion 202 indicates to the appropriate manager (e.g. device manager 20 acting as an environment 12, 14 access manager) that the user wishes to enter and access one or more applications 64 associated with the particular play environment 14, which can include the display of an intermediate log-in interface 110 (see FIG. 4). Examples of the active element (e.g. graphical element 204) used as virtual controls to provide for interaction to (and within) applications 60 as well as to provide interaction with data 22, 24 can be such as but not limited to: computer icons, widgets, and/or a hypertext link.

A computer icon can be defined as a pictogram displayed on the computer screen 105 (see FIG. 2) and used to navigate to or within the environment 12, 14. The icon itself can be a small picture or symbol serving as a quick, "intuitive" representation of a software tool, function 40,60 or a data file 22,24 accessible in one or the environments 12, 14. The icon can function as an electronic hyperlink or file shortcut to access the program 40, 60 or data 22, 24. The icon can be a small picture that represents objects such as a file 22, 24 or program, 40, 60 itself or functionality within the file 22, 24 or program, 40, 60. The icon can be used as a quick way (e.g. one selection shortcut) to execute commands, open documents/files, and run programs.

Widgets can be qualified as virtual to distinguish them from their physical counterparts, e.g. virtual buttons that can be clicked with a pointer/touch, vs. physical buttons that can be pressed with a finger. Example widgets are such as but not limited to a button, a slider, an icon, a link, a tab, a scrollbar, and a radio button. The widget can also be represented as a handle used as an indicator of a starting point for a drag and drop operation. Typically, the shape changes when a pointer or finger is placed on the handle, showing an icon that represents the supported drag operation. Further, GUI widgets are one example of the active elements (e.g. graphic elements 204) used as graphical based controls for manipulation by the user. Examples of these control widgets can be scroll bars, sliders, list boxes and buttons. Using these widgets, the user is able to define and manipulate the data 22, 24 and the display for the software program 40, 60 they are working with. Alternatively, the widget (or control) can be defined as an element of a graphical user interface (GUI) that displays an information arrangement changeable by the user, such as a window or a text box. The defining characteristic of the widget can be to provide a single (or dedicated) interaction point for the direct manipulation of a given kind of data 22, 24 and/or application 40, 60. In other words, widgets can be basic visual building blocks which, combined in an application 22, 24 or interface, hold links to the data 22, 24 processed by the application 40, 60 and the available interactions on this data 22, 24.

A text hyperlink can performs much the same function as the functional computer icon or widget as described above, as the text hyperlink can provide a direct link to some function (e.g. application 40,60 itself or function within an application 40,60) or data 22,24 available in the environment 12, 14. Although they can be customized, these text hyperlinks can share a standardized recognizable format, e.g. blue text with underlining, which is unique and different for each of the portions 200,202. Hyperlinks can differ from the functional computer icons or widgets in that hyperlinks are normally embedded in text, whereas icons or widgets are displayed as stand-alone on the screen real estate of the user interface 104. Hyperlinks can also be displayed in text, either as the link itself or a friendly name, whereas icons or widgets can be defined as being primarily non-textual.

Also recognized is that the above-described active elements can be used as a password submission mechanism inputted into the user interface 140 by the device 10 user when the user logins in from one environment 12, 14 to another environment 12, 14 of the multi-environment set. For example, a predefined gesture (e.g. finger swipe representing a trace of a defined geometrical pattern—for example a zig zag) can be used by the managers 20, 26, 28 to identify and authorize login of the user to the environment 12, 14 associated with the respective password. As noted, a password is a secret word or string of characters that is used for user authentication to prove identity, or for access approval to gain access to an environment 12, 14 (example: an access code is a type of password) as a portion of user identification information provided to one or more of the managers 20,26,28 to complete a login procedure in order to gain access and thereby switch from one of the environments 12, 14 to another of the environments 12, 14 of the multi-environment set available via the user interface 104 of the device 10.

Further, despite the name, there is no need for passwords to be actual words; indeed passwords which are not actual words may be harder to guess, a desirable property. Some passwords can be formed from multiple words and can more accurately be called a passphrase. The term pass code can be used for a password and is sometimes used when the secret information is purely numeric, such as the personal identification number (PIN). Passwords are generally short enough to be easily memorized and typed or otherwise spoken or gestured. As discussed, password types can be such as but not limited to: biometric based passwords providing authentication using unalterable personal characteristics; non-text-based passwords, such as graphical passwords, images or mouse or other movement (e.g. gesture via touch on touch screen and/or actual movement of device 10 as identified by on-board motion sensors) based passwords.

Referring again to FIGS. 3*a*, *b*, *c*, *d*, FIG. 3*a* shows a slide to unlock gesture, such that when the user wishes to access one of the environments 12, 14, the user selects the appropriate active graphical element 204 in the associated portion 200,202 and then operates the active graphical element 204 by sliding it in the direction indicated (e.g. left for work and right for play). Upon operation of the active graphical element 204 in the work portion 200 of the user access interface 100, the appropriate manager 20, 26, 28 receives an access work environment command and the result is that the user interface 104 is configured as the work environment 12, whereby the user can then access all applications 62 and data 22 belonging to the work environment 12. Upon operation of the active graphical element 204 in the play portion 202 of the user access interface 100, the appropriate manager 20, 26, 28 receives an access play environment command and the result is that the user interface 104 is configured as the play environment 14, whereby the user can then access all applications 64 and data 24 belonging to the play environment 14.

It is recognized that activation of the graphical element 204 (e.g. activation element) could cause the appropriate manager 20,26,28 responsible for the requested new environment 12, 14 (i.e. the alternative environment 12, 14 to which the user is switching from the current environment 12, 14 configured on the user interface 104) to generate a password screen or other command represented on the user interface 104 (e.g. presented visually and/or audibly and/or as tactile—for example a series of vibrations) indicating that the requisite user password should be entered into the user interface 104 by the user before gaining access and therefore switching from one environment 12, 14 to another environment 12, 14. Again, it is envisioned that the user name as part of the user identification for access to environments 12, 14 (via the manager 20, 26, 28) can be part of the user identification in addition to the requested password, whereby the user name is the same for at least a pair of environments 12, 14 (e.g. the current environment and the user selected next environment) of the multi-environment set configured or otherwise available on the device 10. In some cases, the user name would be a default value that would supplied automatically from one manager 20, 26, 28 to another manager 20, 26, 28 without needed user input from the user for entering the user name manually via the user interface 104.

Figure 3B:
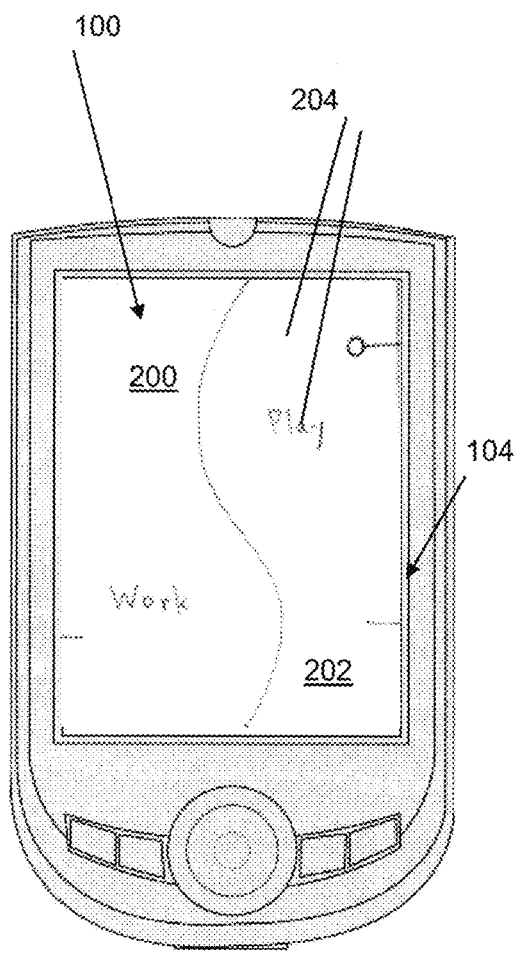

FIG. 3b shows a hold and release gesture (e.g. example of predefined gesture), such that when the user wishes to access one of the environments 12, 14, the user selects the appropriate active graphical element 204 (e.g. a portion of the background) in the associated portion 200,202 and then holds the selection of the active graphical element 204 for a predetermined period of time. Upon operation of the active graphical element 204 in the work portion 200 of the user access interface 100, the appropriate manager 20, 26, 28 receives an access work environment command and the result is that the user interface 104 is configured as the work environment 12, once authenticated via entry and confirmation of correct password, whereby the user can then access all applications 62 and data 22 belonging to the work environment 12. Upon operation of the active graphical element 204 in the play portion 202 of the user access interface 100, the appropriate manager 20, 26, 28 receives an access play environment command and the result is that the user interface 104 is configured as the play environment 14, whereby the user can then access all applications 64 and data 24 belonging to the play environment 14. It is recognized that for access to the play environment 14, the manager 20, 26, 28 may not request a respective play environment password in order for the user to gain access (i.e. switch) between the environments 12, 14.

Figure 3C:
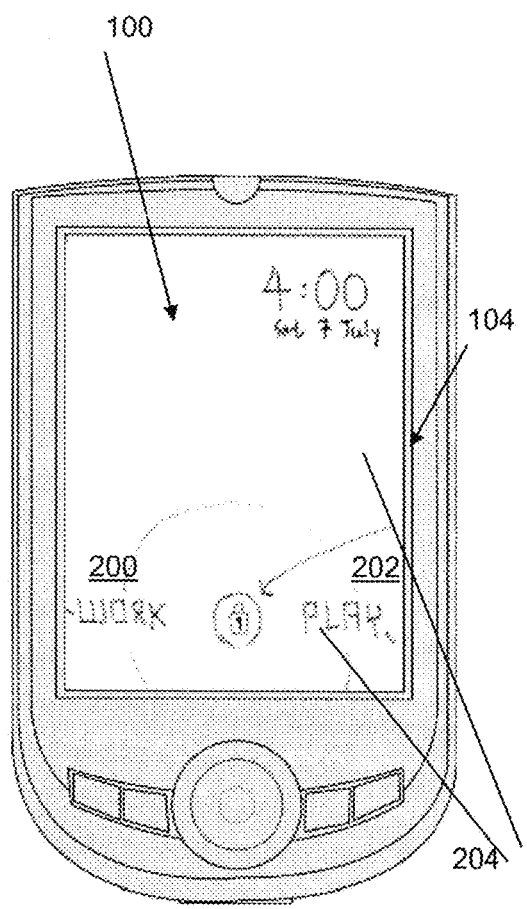

FIG. 3c shows a hold and drag gesture (e.g. example of predefined gesture), such that when the user wishes to access one of the environments 12, 14, the user selects the appropriate active graphical element 204 (e.g. lock icon) between the associated portions 200,202 and then drags the active graphical element 204 towards the portion 200,202 associated with the desired environment 12, 14. Upon operation (e.g. drag) of the active graphical element 204 towards the work portion 200 of the user access interface 100, the appropriate manager 20, 26, 28 receives an access work environment command and the result is that the user interface 104 is configured as the work environment 12, once authenticated via entry and confirmation of correct password, whereby the user can then access all applications 62 and data 22 belonging to the work environment 12. Upon operation (e.g. drag) of the active graphical element 204 towards the play portion 202 of the user access interface 100, the appropriate manager 20, 26, 28 receives an access play environment command and the result is that the user interface 104 is configured as the play environment 14, whereby the user can then access all applications 64 and data 24 belonging to the play environment 14.

Figure 3D:
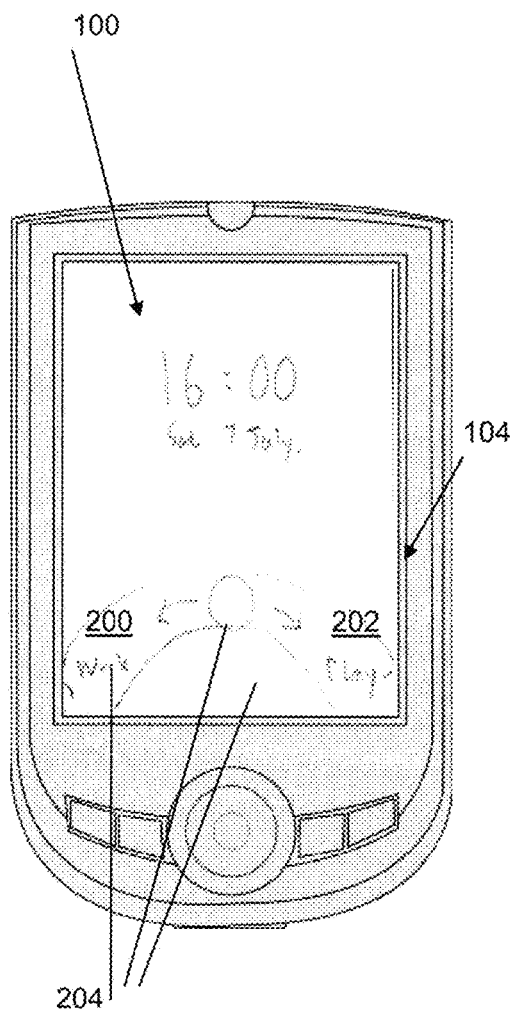

FIG. 3d shows an alternative embodiment of the hold and drag gesture, such that when the user wishes to access one of the environments 12, 14, the user selects the appropriate active graphical element 204 (e.g. circle icon) between the associated portions 200,202 and then drags the active graphical element 204 towards the portion 200,202 associated with the desired environment 12, 14. Upon operation (e.g. drag) of the active graphical element 204 towards the work portion 200 of the user access interface 100, the appropriate manager 20, 26, 28 receives an access work environment command and the result is that the user interface 104 is configured as the work environment 12, once authenticated via entry and confirmation of correct password, whereby the user can then access all applications 62 and data 22 belonging to the work environment 12. Upon operation (e.g. drag) of the active graphical element 204 towards the play portion 202 of the user access interface 100, the appropriate manager 20, 26, 28 receives an access play environment command and the result is that the user interface 104 is configured as the play environment 14, whereby the user can then access all applications 64 and data 24 belonging to the play environment 14.

FIG. 3e shows a diagonally designed "Work/Play" target as the graphical element 204 to enable an user experience and presentation on one single page as the user access interface 100, which can be supplemented by a notifications widget 206 (e.g. scrollable) displayed on the user interface 104 as a region in which to receive (e.g. from the appropriate manager 20,26,28) and to view and access notification messages (e.g. network messages 17) that can be directed (e.g. associated) with either of the environments 12, 14. As further described below, the notifications widget 206 can display indications 208 of the data 22, 24 available in the respective environment 12, 14, rather than the actual content of the data 22, 24 itself. Examples of the indication 208 are "Work email arrived", "2 Pending Play text messages", "Work VM", etc. Alternatively, the indication 208 can contain header information of the communication 17 (e.g. sender name, time of receipt, title of communication 17) but not the actual body of the communication 17. As such, the indications 208 contain the content of which environment 12, 14 the actual communication 17 (or data 22,24) pertains to as well as communication type (e.g. email, text, voicemail, etc.) and can optionally contain header information while at the same time restricting access to the communication 17 body content. As discussed below, in the event that the user is not "in" (e.g. the user interface 104 being configured as that environment 12, 14 for providing access to the environment dependent applications 60 and data 22,24) the environment 12, 14 pertaining to the actual communication 17 as represented by the indication 208, the user can operation or otherwise navigate to the user access interface 100 and via the appropriate manager 20,26,28 configure the user interface 104 as the respective environment 12, 14 associated with the actual communication 17. Once so configured with the proper environment 12, 14, the user can gain access to the actual content data 22, 24 (e.g. body) of the communication 17 that was previously represented by the indication 208 in the notification widget 206.

Referring again to FIG. 3e, using "Touch and hold" concept (e.g. example of predefined gesture) to expand to "play" or work environment, the user selects the appropriate active graphical element 204 (e.g. portion 200,202 background) of the associated portion 200,202. Upon operation (e.g. select) of the active graphical element 204 of the work portion 200 of the user access interface 100, the appropriate manager 20, 26, 28 receives an access work environment command and the result is that the user interface 104 is configured as the work environment 12, whereby the user can then access all applications 62 and data 22 belonging to the work environment 12. Upon operation (e.g. select) of the active graphical element 204 of the play portion 202 of the user access interface 100, the appropriate manager 20, 26, 28 receives an access play environment command and the result is that the user interface 104 is configured as the play environment 14, once authenticated via entry and confirmation of correct password, whereby the user can then access all applications 64 and data 24 belonging to the play environment 14.

FIG. 3f shows a top-bottom layout "Work/Play" access user interface 100 that provides for integrated user experience and presentation on one single page interface 100, supplemented by one or more notification widgets 208 (e.g. scrollable at the bottom of screen). The access use interface 100 can also be equipped with additional pre-configured/user settable icons and/or folders 204 on this layout, riding on traditional touch point to expand folder/sub-category or direct applications 60 (see FIG. 1) access, depending upon which environment is selected via the active graphical element 204 (e.g. "work" or "play" tab). Using a hold and release or tap gesture, when the user wishes to access one of the environments 12, 14, the user selects the appropriate active graphical element 204 (e.g. tab) of the associated portion 200,202 and then holds the selection of the active graphical element 204 for a predetermined period of time. Upon operation of the active graphical element 204 in the work portion 200 of the user access interface 100, the appropriate manager 20, 26, 28 receives an access work environment command and the result is that the user interface 104 is configured as the work environment 12, once authenticated via entry and confirmation of correct password, whereby the user can then access all applications 62 and data 22 belonging to the work environment 12. Upon operation of the active graphical element 204 in the play portion 202 of the user access interface 100, the appropriate manager 20, 26, 28 receives an access play environment command and the result is that the user interface 104 is configured as the play environment 14, whereby the user can then access all applications 64 and data 24 belonging to the play environment 14.

Figure 3G:
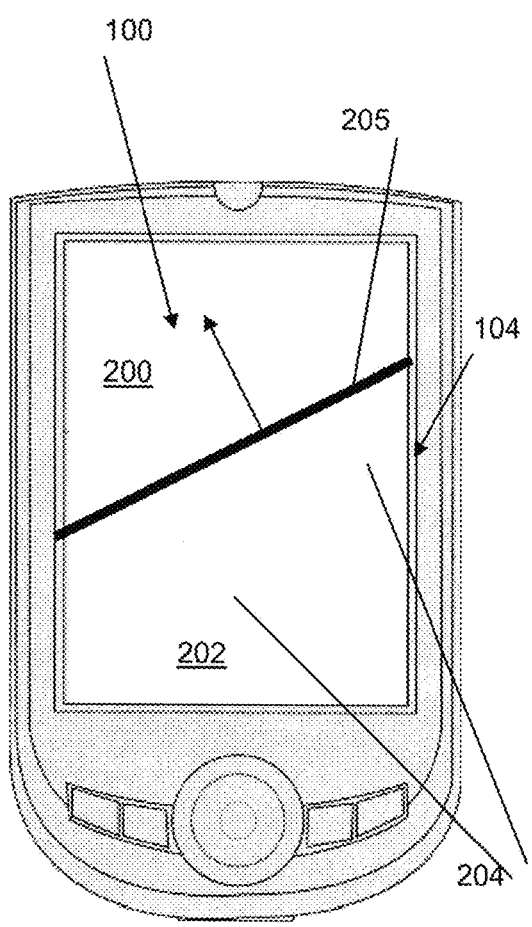
Figure 3H:
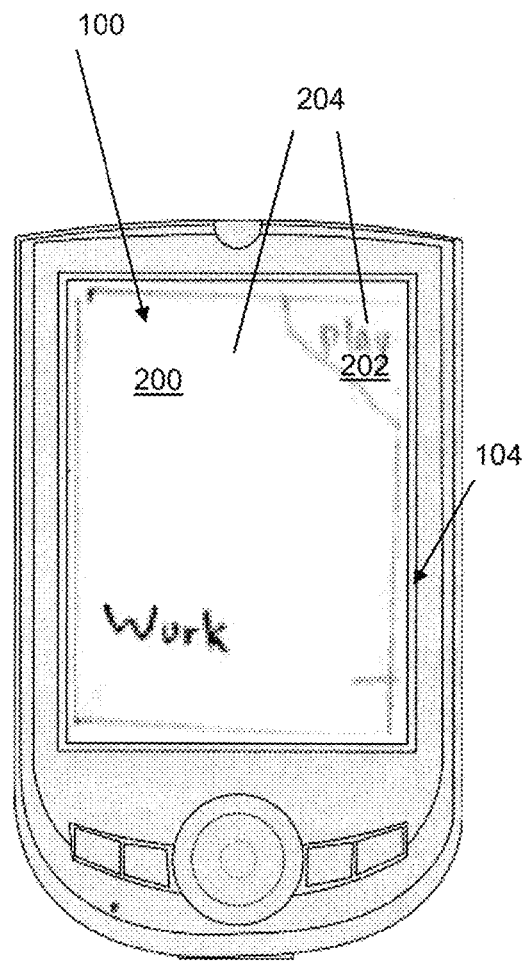

Referring to FIG. 3h, a Location-based Mode of the access use interface 100 is shown, such that a layout of the display 105 (see FIG. 2) is based on location dependent (Cell ID/WiFi SSID/Lat-Lon) sensing/detection of which wireless network 27 is available to the common platform 30, which impacts the layout of the respective "Work/Play" graphical elements 204. For example, based on which wireless network 27 is available from a list of predefined networks stored in the storage 32 (or alternatively if the detected network 27 is determined to be the work dedicated/defined network 27 or not, such that any detected network 27 other than the work dedicated/defined network 27 is assumed to be the play network 27). For example, shown in FIG. 3h is where the common platform 30 (e.g. device manager 20) detected the available wireless network(s) 27 did contain the work network 27 as predefined in the storage 32. Accordingly, the graphical elements 204 representing the work environment 12 are displayed in a greater portion of the screen real estate than the graphical elements 204 representing the play environment 14.

Figure 3I:
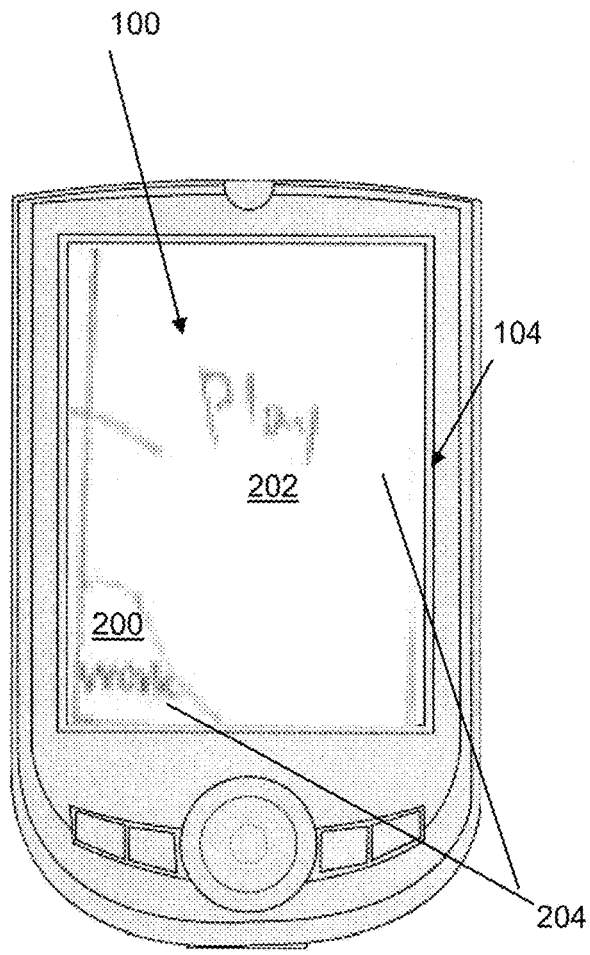

It is recognized that graphical elements 204 for both of the environments 12, 14 are displayed, however the work related graphical elements 204 are displayed more prominently (e.g. larger, darker shade, bolder font type, etc.) than the play related graphical elements 204. For example, shown in FIG. 3i is where the common platform 30 (e.g. device manager 20) detected the available wireless network(s) 27 did contain the play network 27 as predefined in the storage 32 (or did not contain the work network 27 as predefined in the storage 32). Accordingly, the graphical elements 204 representing the play environment 14 are displayed in a greater portion of the screen real estate than the graphical elements 204 representing the work environment 12. It is recognized that graphical elements 204 for both of the environments 12, 14 are displayed, however the play related graphical elements 204 are displayed more prominently (e.g. larger, darker shade, bolder font type, etc.) than the work related graphical elements 204.

Further to FIGS. 3h, i, equipped with location detection of the common platform 30, once the device 10 is attached to a known/pre-configured location, i.e. work, the pre-configured/user settable icons and/or folders will be presented, riding on "Touch and hold" (e.g. predefined gesture) concept at the top corner if need to alternate between "Work/play" environments 12, 14.

It is recognized that the different user access interfaces 100 as discussed above can be stored in the storage 32 as a group of predefined user access interfaces 100, such that the selection/configuration manager (e.g. manager 20) can be used to select the desired user access interface 100 from the group to use as the user access interface 100 to access the work and play environments 12, 14, as further described below. It is also understood that any or all of the described "gestures", recognized by the manager(s) as user supplied commands or instructions, can be performed as touch screen gestures (i.e. the screen of the user interface is contacted or is otherwise configured to detect adjacent proximity of a user's digit—e.g. one or more fingers—and/or writing stylus) and/or can be performed as air gestures (i.e. the user provides a predetermined motion or gesture without touching the screen of the user interface 104, such that the air gesture is captured by the camera or other imager of the device 10 and then recognized by the manager(s) as a predefined command or instruction).

Configured User Interface 104 Upon Selection of Desired Environment 12, 14

Figure 4:
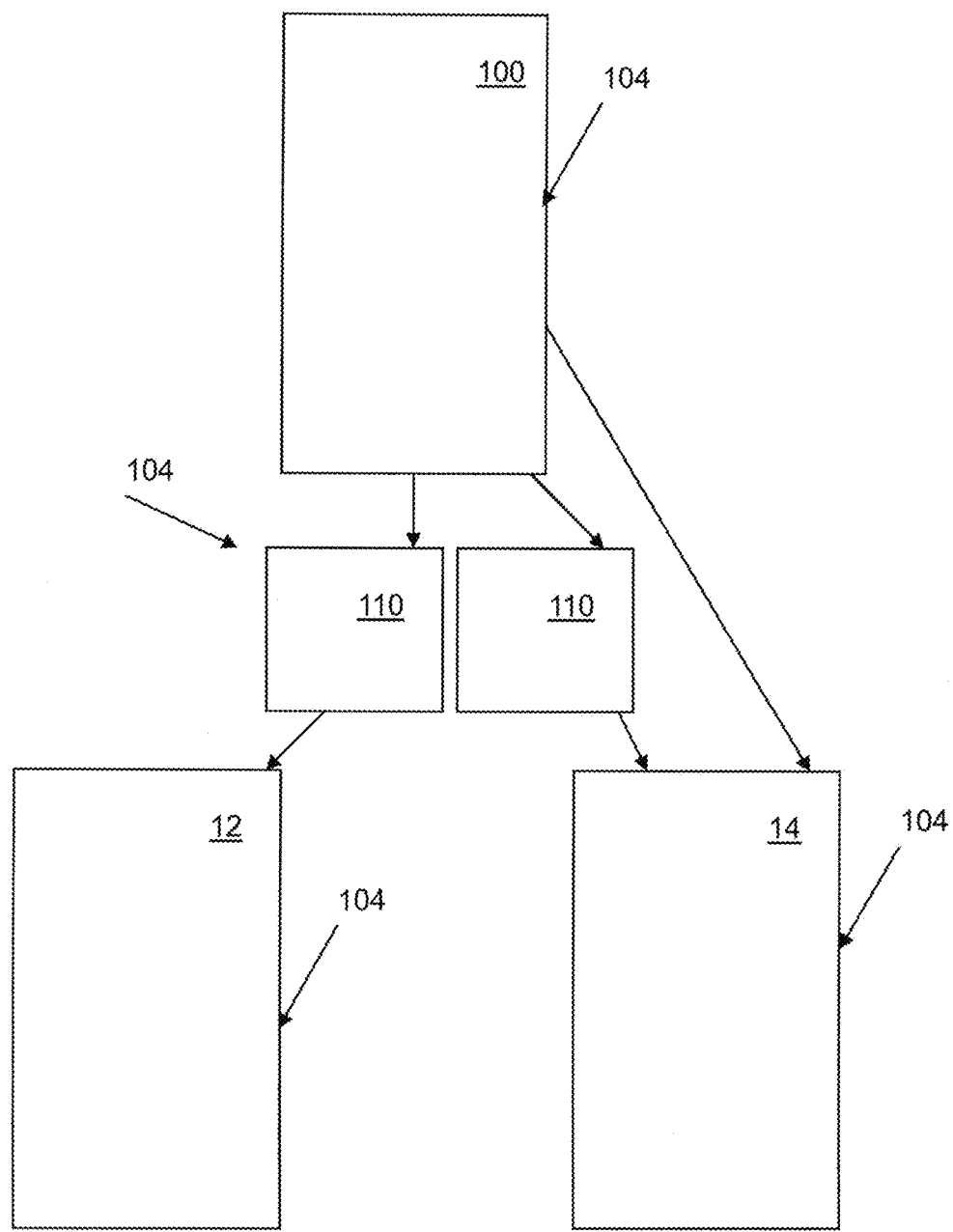
FIG. 4 shows a block diagram of optionally using a login interface between the user access interface and a selected environments of the device of FIG. 1.
Figure 6:
FIG. 6 is an example screen of a play environment of the device of FIG. 1.
Figure 7:
FIG. 7 is an example screen of a work environment of the device of FIG. 1.

Referring to FIG. 4, shown is a log-in screen 110 used to access the selected environment 12, 14 from the user access interface 100. After the desired environment 12, 14 is selected by the user from the user access interface 100, the appropriate manager 20, 26, 28 displays a log-in screen 110 to the user via the user interface 104. Upon successful login (i.e. acceptance of password entered by user of account name and/or password entered), the appropriate manager 20, 26, 28 configures the user interface as either the work environment 12 or play environment 14 (as selected in the user access interface 100 via the graphical element 204). Examples of the work environment 12 are shown in FIG. 6 and examples of the play environment 14 are shown in FIG. 7. Any subsequent interaction with the applications 60 and/or data 22, 24 on the interface 104 will then be allowed with those respective data 22, 24 and applications 62, 64 associated with the configured environment 12, 14 only, and any interaction with the applications 60 and/or data 22, 24 on the interface 104 from the other environment 12, 14 (i.e. the non-selected environment 12, 14) will be restricted. As discussed above, the only access by the user to information from the non-selected environment 12, 14 (i.e. the environment 12, 14 that is not configured on the user interface 104) is via the indications 208 (e.g. displayed in the notification widget/graphical element 206). It is recognized that the log-in screen 110 can be optional for the play environment 14, in the case where the play environment 14 is configured as the default environment of the user interface 104.

Figure 5A:
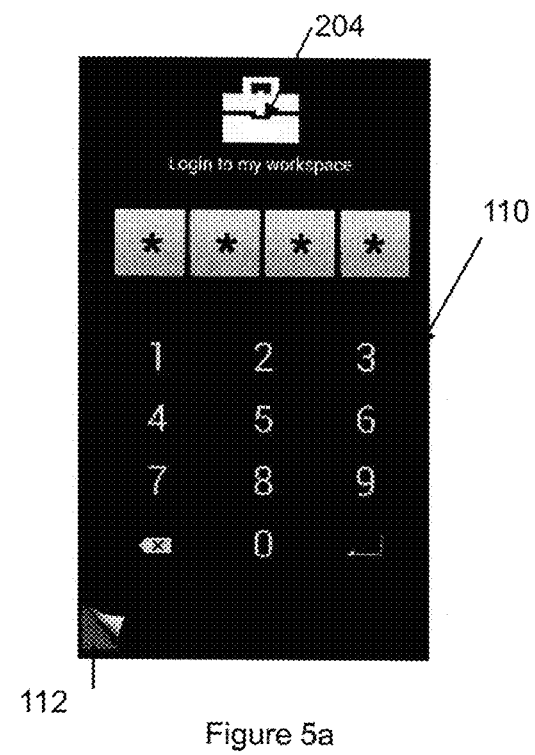
FIGS. 5a, b, c provide alternative embodiments of the login interface of FIG. 4.
Figure 5B:
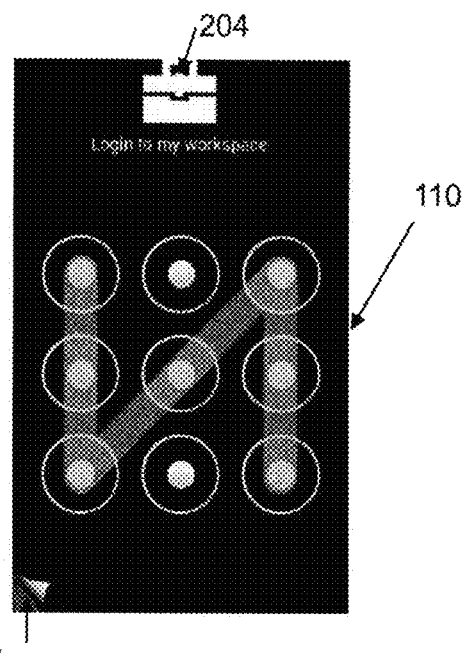
Figure 5C:
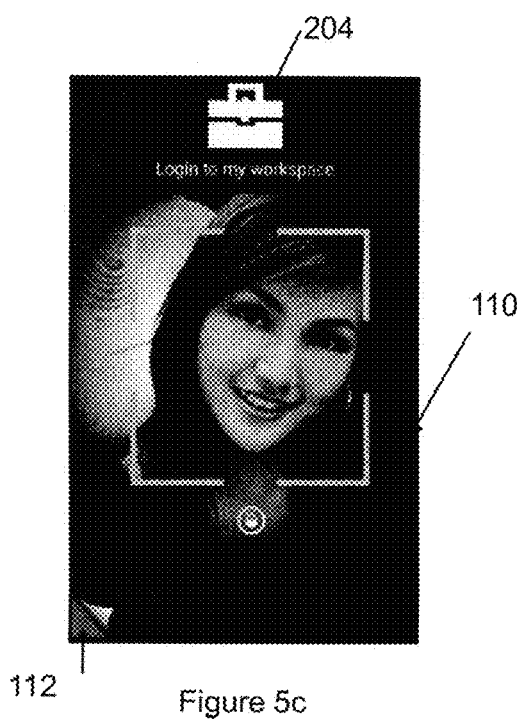

Referring to FIGS. 5a,b,c, shown are various different embodiments of the log-in screen 110, where FIG. 5a shows selection of an alpha-numeric pass code, FIG. 5b shows a pattern code, and FIG. 5c shows a biometric code such as a facial recognition (example others are fingerprint and voice recognition). Upon entry of the code by the user, the appropriate manager 20, 26, 28 receives the code and proceeds to configure the user interface 104 with the corresponding environment 12, 14. Present on the log-in screen 110 can be a graphical element 204 representative of the environment 12, 14 for which the code is relevant for.

Also shown is an optional switch graphical element 112 displayed on the log-in screen 110, which can be used by the user to change from the login screen 110 to the login screen 110 of the other environment 12, 14 and/or to instruct the appropriate manager 20, 26, 28 to directly configure the user interface 104 with the corresponding other environment 12, 14 (e.g. in the case where no login screen 110 is used for the other environment 12, 14 access). An example of the switch graphical element 112 is a swipe gesture by the user across the switch graphical element 112, which would then send the switch command to the appropriate manager 20, 26, 28. It is recognized that the switch graphical element 112 can have a display location on the user interface 104 that is predefined as consistent between different display configurations of the user interface 104. For example, each display screen in both the work environment 12 and the play environment 14 can have the same switch graphical element 112 located in the same display location (see FIGS. 6 and 7). One example of the consistent display location is at the lower left corner of the display. Another example of the consistent display location is at the lower right corner of the display. Another example of the consistent display location is at the upper right corner of the display. Another example of the consistent display location is at the upper left corner of the display. Another example of the consistent display location somewhere between the corners of the display. Another example of the consistent display location on one of the side edges of the display.

Referring to FIG. 6, shown is an example play environment 14 screen, having a switch graphical element 112, and one or more passive graphical elements 204 (e.g. icon, background, etc. having a predefined graphical/visual format representative of the respective environment 12, 14) that are uniquely representative of the play environment 14 over that of the work environment 12. One advantage of the unique passive graphical element 204 is to provide context to the user as to which environment 12, 14 the user currently has selected for configuration as the user interface 104. It is also recognized that the layout of applications 64 in the environment 14 could also be distinctive from the other environment 12. Referring to FIG. 7, shown is an example work environment 12 screen, having a switch graphical element 112, and one or more passive graphical elements 204 (e.g. icon, background, etc. having a predefined graphical/visual format representative of the respective environment 12, 14) that are uniquely representative of the work environment 12 over that of the play environment 14. One advantage of the unique passive graphical element 204 is to provide context to the user as to which environment 12, 14 the user currently has selected for configuration as the user interface 104. It is also recognized that the layout of applications 62 in the environment 12 could also be distinctive from the other environment 14.

Figure 8:
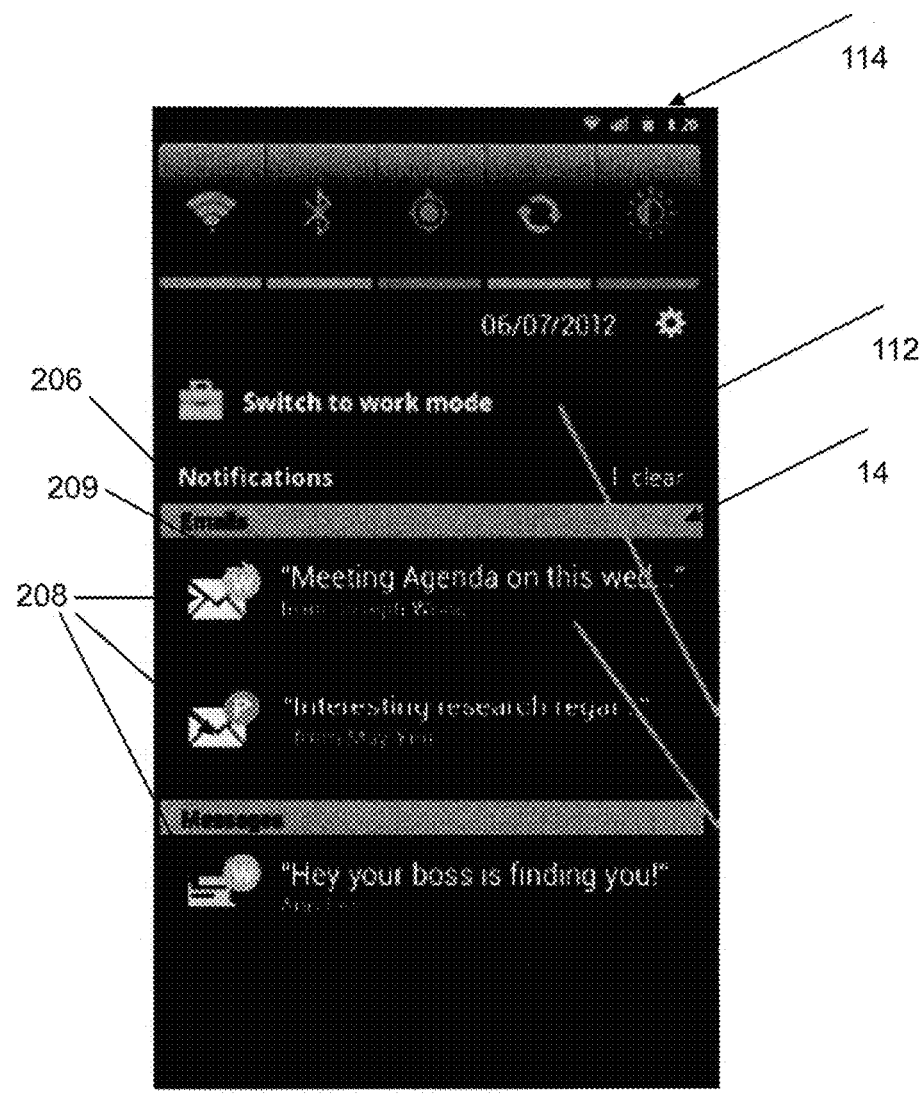
FIG. 8 is an alternative embodiment of an environment switch mechanism for the device of FIG. 1.

Referring to FIG. 8, an alternative switch method between environments 12, 14 is shown as a dedicated notification interface 114, such by example is shown the current environment 14 and a positioned switch graphical element 112 thereon. Also shown are the indications 208 with respective environment identifiers 209 used to identify which environment 12, 14 the indications belong to. Alternatively, selection of any of the indications 208 by the user could send the switch command to the appropriate manager 20, 26, 28. As given above, any of the user access interfaces 100 could also be used as a switch environment mechanism, such that activation of any switch graphical element 112 could result in the subsequent display of a default user access interface 100.

Figure 9:
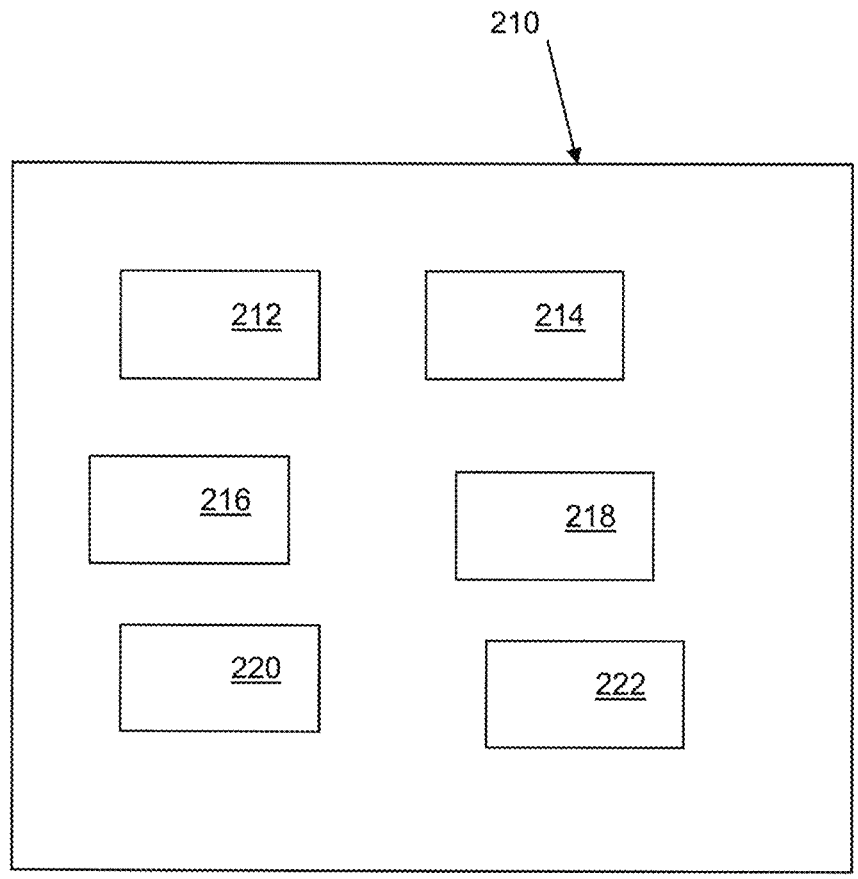
FIG. 9 is a block diagram of a configuration module of the device of FIG. 1.

Referring to FIG. 9, shown is a configuration module 210, which can be provides as a subset of the functionality of any of the managers 20,26,28 (see FIG. 1), either in whole or on part. For example, the configuration module 210 is a subset of the functionality of the manager 20. For example, the configuration module 210 is a subset of the functionality of the manager 26. For example, the configuration module 210 is a subset of the functionality of the manager 28. The configuration module 210 can include an application module 212 for managing and configuring which access to what resources/apps 40,60 are sensitive as well as to add, update, and/or delete apps 40,60 (work or play) on the device 10. The configuration module 210 can include an access module 214 for selecting which of the user access interfaces 100 to use as a mechanism to select one or the other of the environments 12, 14, such that all of the user access interface 100 types can be stored in the storage 32 for selection and implementation by the access module 214 for subsequent operation of the user interface 104. The configuration module 210 can include a password module 216 for selecting which of the login interfaces 110 to use as a mechanism to login to one or the other of the environments 12, 14, such that all of the login interface 110 types can be stored in the storage 32 for selection and implementation/configuration by the password module 216 for subsequent operation of the user interface 104. The configuration module 210 can include a switch module 218 for selecting which of the switch elements 112 to use as a mechanism to switch from one or the other of the environments 12, 14, such that all of the switch element 112 types can be stored in the storage 32 for selection and implementation/configuration by the switch module 218 for subsequent operation of the user interface 104. The configuration module 210 can include a theme module 220 for configuring the respective graphical formats of the different environments 12, 14, such that all of the graphical format types can be stored in the storage 32 for selection and implementation/configuration by the theme module 220 for subsequent operation of the user interface 104. The configuration module 210 can include a security module 222 for configuring the respective security settings of the different environments 12, 14, such that all of the security setting types can be stored in the storage 32 for selection and implementation/configuration by the security module 222 for subsequent operation of the user interface 104.

Figure 10:
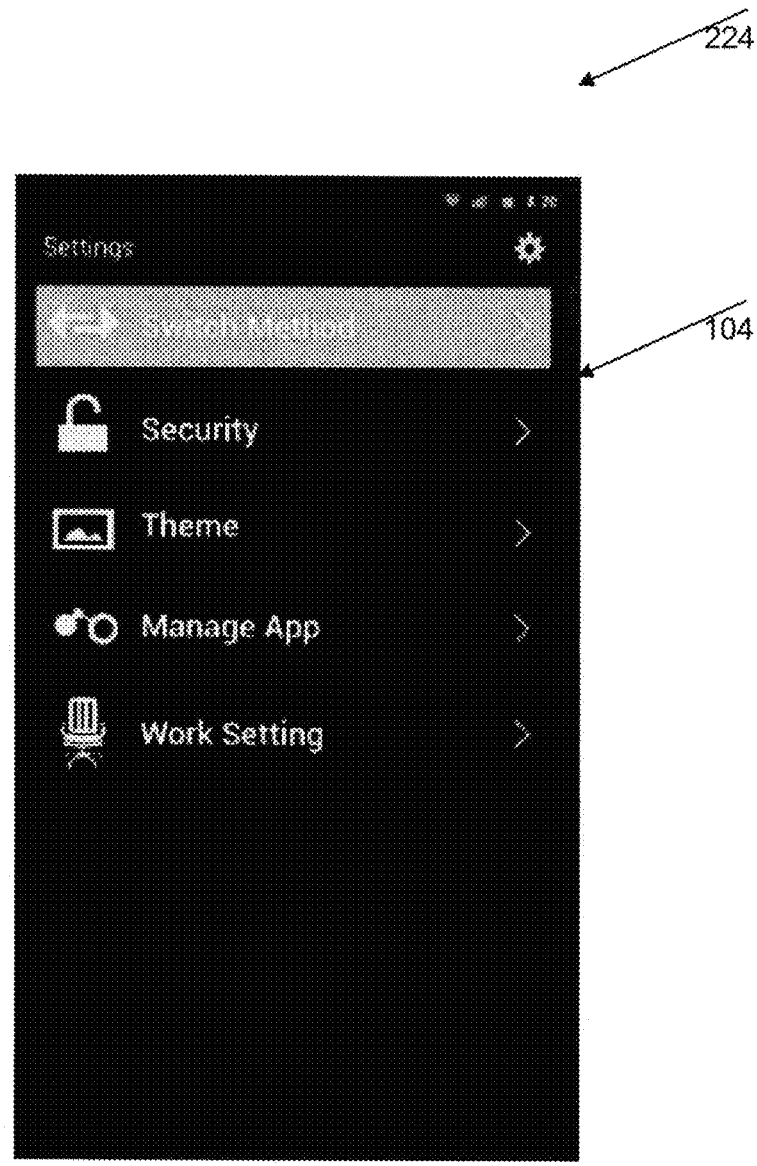
FIG. 10 is an example interface of the configuration module of the device of FIG. 9.

Referring to FIG. 10, shown is an example configuration interface 224 of the configuration module 210, such that a graphical format of the configuration interface 224 (e.g. color coded) can be used to indicate to the user which of the environments 12, 14 the configuration settings are accessing.

Other options are multiple home screens for a particular environment 12, 14. As discussed above, the advantage of the user interface 104 in communication with the managers 20,26,28 assigned to the respective environment 12, 14 is that the device 10 can be configured as having two or more different environments 12, 14 for the same user name, i.e. for the same persona.

A further alternative embodiment is shown in FIG. 3g, such that a barrier element 205 is displayed between the two environments 200, 202, shown on the user interface as a visual barrier between the displayed environments 200,202. In one example, the barrier element 205 scrolls 207 across the user interface as the environment 200,202 changes from one to the other.

Further, it is recognized generally that the notification menu (e.g. notification widget 206—see FIGS. 3e and 8) shown in one environment 12, 14 can be of a predefined unique visual format that is different from the same notification menu 206 when displayed in conjunction with a different environment 12, 14. As such, the notification menu 206 can have differently configured visual format manifestations depending upon which of the environments 12, 14 it is displayed in conjunction with. For example, presenting the notification menu 206 on the user interface 104 for containing work environment 12 notification type and personal environment 14 notification type can be configured by the appropriate manager, such that a notification presented in the notification menu 206 can be configured by (e.g. a notification) manager to withhold presentation of notification content of the notification if the environment notification type does not match the environment type 12, 14. Further, the notification content that is withheld can be a body content of the notification, such that a notification type is explicitly presented in the notification menu 206 as a label for the notification. It is also recognized that a display location on the user interface 104 of the notification menu 206 can be common to both the work environment 12 and the play environment 14 (see FIG. 3e or FIG. 8).

In terms of visual elements of the notification menu 206, these can be defined by a set of unique personal environment user interface design elements when the user interface 104 is configured as the personal environment 14 and can be defined by a set of unique work environment user interface design elements when the user interface 104 is configured as the work environment 12. The visual elements of the unique work/personal environment user interface design elements can be selected from the group consisting of: shape; shade; color; and/or pattern.

Figure 11:
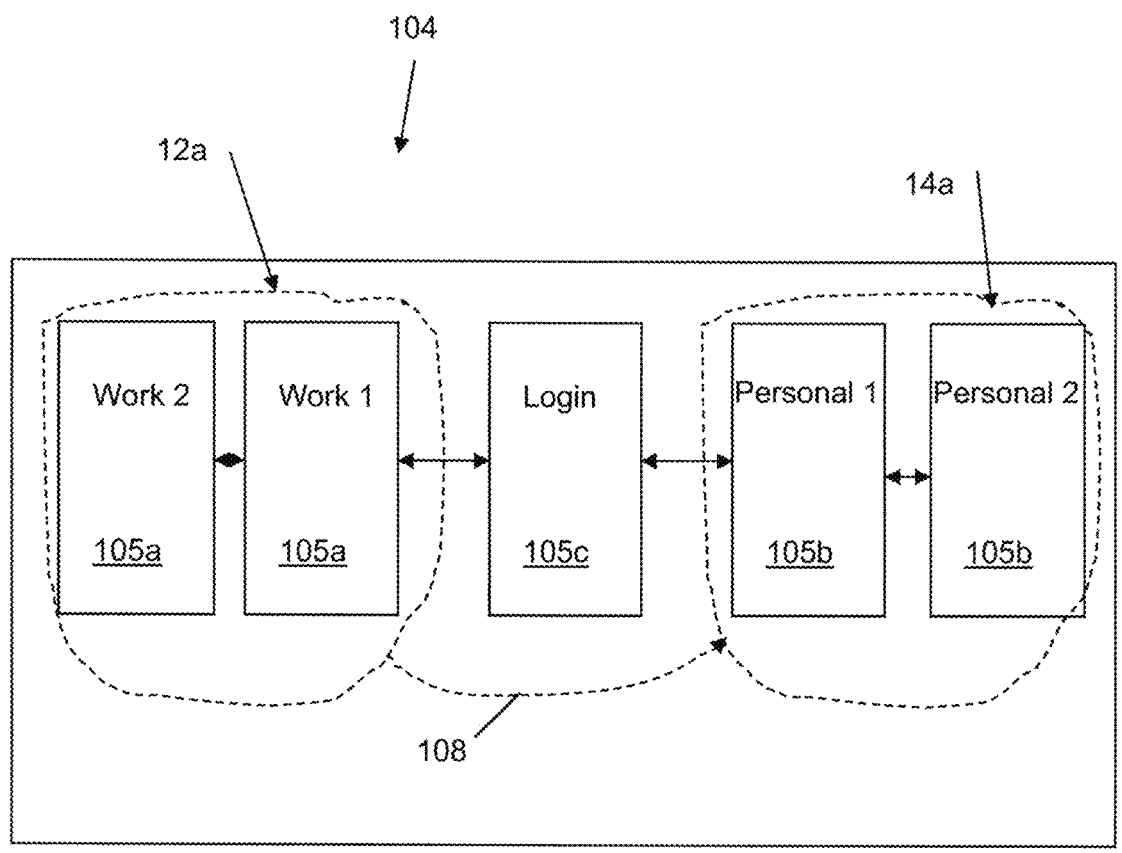
FIG. 11 is an alternative embodiment of the switch mechanism of FIG. 8.

Referring to FIG. 11, an alternative embodiment is shown whereby the work environment 12 and the play environment 14 are displayed on the user interface 104 as a series of sequential (e.g. one at a time) display screens 105a, b, such that a plurality of sequential work screens 105a of the work environment are grouped together as a work group 12a and a plurality of sequential personal screens 105b of the personal environment are grouped together as a personal group 14a. Navigation between the sequential screens 105 can be done via a user interface action performed by the device user, for example as a simple gesture (e.g. finger swipe from side to side). Further, in the event of a change between the work environment 12 and the personal environment 14, the intermediate login screen 105c can be presented (requiring acceptance of the entered work password) before the next sequential work screen 105a can be displayed on the user interface 104. As such, the intermediate login interface 105c can be presented on a display positioned between any of the groups 12a, 14a. It is recognized that there can be more than one defined personal group 14a and/or more than one defined work group 12a. As discussed, presentation of the sequential screens 105a,b,c can be presented on the user interface 104 one at a time, such that sequential display of each individual screen 105a,b,c on the user interface 104 can be separated by a predefined gesture (e.g. finger swipe). An example display sequence is as follows: first a personal screen 105b on the user interface 104 followed by the predefined gesture followed by the intermediate login screen 105c on the user interface 104 followed by a work screen 105a on the user interface 104. Further, any personal screen 105b on the user interface 104 followed by the predefined gesture can be subsequently followed by another personal screen 105b on the user interface 104. Further, any work screen 105a on the user interface 104 followed by the predefined gesture can be subsequently followed by another work screen 105a on the user interface 104. It is also recognized that in the case of two or more different work environments 14 in the multi-environment, an example display sequence is as follows: first a work screen 105a on the user interface 104 followed by the predefined gesture followed by the intermediate login screen 105c on the user interface 104 followed by a work screen 105a of a different work environment 12 on the user interface 104.

Referring again to FIG. 11, the intermediate login screen 105c could be optional (e.g. skipped over or otherwise bypassed from display on the user interface 104) when the user is switching from the work screen 105a (e.g. any work screen 105a of the work group 12a) to the personal screen 105b (e.g. any personal screen 105b of the personal group 14a), as shown by reference arrow 108. It is recognized that motivation of the device user to switch from the current display screen 105a, b (configured on the user interface 104) to a different one could be the receipt of a notification in the notification menu 206. For example, the notification displayed could indicate which work/personal environment 12, 14 the notification can be accessed in. For example, as provided below, the notification menu 206 displayed along with the display screen Work 2 (representing a work environment 12) could indicate that a notification (e.g. email) has arrived as tagged or otherwise labelled/associated with the display screen Personal 1 (representing a personal environment 14).

Further, it is recognized that the manager 20,26,28 (e.g. the intermediate device manager 20) could be configured by instructions stored on the memory 32 (see FIG. 12) to recognize and act on a first gesture mechanism (e.g. finger swipe, device shake, air gesture, or other motion based input recognized by the user interface 104 and/or other sensors— for example imager/camera—present in the device infrastructure 30) to switch from the presently displayed screen 105a,b to a desired display screen 105a,b by a number of screens 105a,105b (in the sequentially ordered display screens 105a,105b) matching (or otherwise associated with) the screen switch number associated with the number of performances/repetitions of the first gesture mechanism. It is recognized that the first gesture mechanism is a motion based input mechanism performed by the device user as an alternative to (i.e. instead of) pressing or otherwise selecting a physical or virtual button dedicated to performing the configured task once pressed/selected.

The repetition number of the first gesture mechanism could be associated with the number of screens 105a, b to switch by. For example, repeating the gesture mechanism (e.g. a finger swipe gesture, a device shake) performed by the user via the user interface 104 a user selected number of times (e.g. two times) would instruct the manager 20, 26, 28 to switch by the same number of screens 105a, b (i.e. the manager 20, 26, 28 would match the number of screens 105a, b to switch by with the number of repetitions of the first gesture mechanism). Referring to FIG. 11, for example if the user interface 104 is configured with the display screen "Work 2" and the user performs the first gesture mechanism of two individual finger swipes (e.g. repeats a finger swipe gesture twice) from right to left, the manager 20,26,28 would recognize by matching (e.g. equating or otherwise assigned) the number of performances of the first gesture mechanism with the specified number of screens 105a,b the user wishes to switch by, in this case two screens to the right (i.e. switching from Work 2, bypassing the display of any screens 105a,b between the present screen Work 2 to end up on the selected screen "Personal 1"). In this case the user interface 104 would display screen Work 2 and then after the repeated first gesture mechanism (a first finger swipe followed by a second finger swipe) would display the display screen Play 1, thereby bypassing the display of the intermediate environment (e.g. work/display) screen(s)—in this case the only intermediate display of display screen Work 1.

In the above case, the user is moving from the work group 12a to the personal group 14a, therefore display of the intermediate login screen 105c may not be (e.g. optional) displayed on the user interface 104 between the display screen Work 2 and the display screen Personal 1, as use of the intermediate login screen 105c is optional (following path 108) when going between any of the work screens 105a to any of the personal screens 105b. However, in the case where the user would be moving from the personal group 14a to the work group 12a, the following switch process could be followed. Referring to FIG. 11, for example if the user interface 104 is configured with the display screen "Personal 2" and the user performs the first gesture mechanism of two individual finger swipes (e.g. repeats a finger swipe twice) from left to right, the manager 20,26,28 would recognize by matching (e.g. equating) the number of performances of the first gesture mechanism with the specified number of screens 105a,b the user wishes to switch by, in this case two screens to the left (i.e. switching from Personal 2, bypassing the display of any screens 105a,b between the present screen Personal 2 to end up on the selected screen "Work 1"). In this case the user interface 104 would display screen Personal 2 and then after the repeated first gesture mechanism (finger swipe followed by a second finger swipe) would display first the intermediate login screen 105c and recognize the required password entry before proceeding to instruct the user interface 104 to display the display screen Play 1, thereby bypassing the display of the intermediate environment (e.g. work/display) screen(s)—in this case only the intermediate display screen Personal 1.

Further to the above, the first gesture mechanism could be a shake of the device 10, such that a sensor (e.g. accelerometer) of the device infrastructure 30 (see FIG. 12) would be recognized by the manager 20, 26, 28. For example, a repeated number of shakes would be interpreted by the manager 20, 26, 28 as a specified number (e.g. two) of display screens 105a, b to switch to. It is also recognized that the number of repetitions may be equal to the same number of screens to follow in the ordered sequence of display screens 105a, b. For example, a number of repetitions (e.g. two) could be matched with moving the same number (e.g. two) of screens 105a,b over in the ordered sequence of display screens 105a,b (e.g. from Personal 2 to Work 1). Alternatively, the number of repetitions may not be equal to the same number of screens to follow in the ordered sequence of display screens 105a, b. For example, a number of repetitions (e.g. one) could be matched with bypassing the number (e.g. one) of screens 105a, b in the ordered sequence of display screens 105a, b (e.g. similarly from Personal 2 to Work 1, as one screen of Personal 1 is bypassed). Alternatively, the number of repetitions of the first gesture mechanism could be assigned to (as recognized by the manager 20, 26, 28) a different number of bypass and/or switch screens. For example, one repetition could be assigned to two switch screens (i.e. to bypass the display of the one intermediate environment screen 105a, b).

Further, the first gesture mechanism could be associated with a directional component. For example, performing the first gesture mechanism in a first predefined direction (e.g. finger swipe left to right, shake from up to down, shake from left to right) could cause the switch of the display screens 105a,b in a predefined direction (e.g. from right to left) in the ordered sequence of display screens 105a,b. Changing the direction of the performance of the first gesture mechanism in a second predefined direction opposite to the first predefined direction (e.g. finger swipe right to left, shake from down to up, shake from right to left) could cause the switch of the display screens 105a,b in a second predefined direction (e.g. from right to left) in the ordered sequence of display screens 105a,b opposite to the first predefined direction.

Further, it is recognized that the manager 20,26,28 (e.g. the intermediate device manager 20) could be configured by instructions stored on the memory 32 (see FIG. 12) to recognize and act on a second gesture mechanism (e.g. finger swipe, device shake, air gesture, or other motion based input recognized by the user interface 104 and/or other sensors—for example camera/imager—present in the device infrastructure 30) to switch from the presently displayed screen 105a,b to the previously displayed display screen 105a,b in the sequentially ordered display screens 105a,105b. It is recognized that the second gesture mechanism can be a motion based input mechanism performed by the device user as an alternative to (i.e. instead of) pressing or otherwise selecting a physical or virtual button dedicated to performing the configured task once pressed/selected. It is also recognized that the second gesture mechanism is a gesture mechanism different from the first gesture mechanism and recognizable as such by the manager 20, 26, 28. For example, the first gesture mechanism can be a one-finger finger swipe (or repeated series of one-finger finger swipes) and the second gesture mechanism can be a finger swipe using a plurality (e.g. two) of fingers simultaneously. As such, it is recognized by the manager 20,26,28 that the second gesture mechanism is a simple display switch mechanism between the current display screen 105a,b and a historically (e.g. immediately previous screen, two screens ago, three screens ago, etc.) displayed display screen 105a,b. In the case where the user switches between (e.g. returns from) a screen 105b in the personal group 14a to a screen 105a in the work group 12a, the intermediate login screen 105c could be presented on the user interface 104 by the manager 20, 26, 28 in response to the second gesture mechanism and require a recognized password entry before displaying the historical (e.g. previous) display screen 105a.

Alternatives to the second gesture mechanism are: a shake gesture wherein the first gesture mechanism is a finger-based gesture; a finger-based gesture wherein the first gesture mechanism is a shake gesture; a swipe based finger gesture wherein the first gesture mechanism is a tap based finger gesture; or a tap based finger gesture wherein the first gesture mechanism is a swipe based finger gesture. In any event, it is intended that the first gesture mechanism and the second gesture mechanism are unique and distinct from one another, as recognized by the manager 20, 26, 28, such that the first gesture mechanism is defined as a user selected number of repetitions associated with a respective predefined number of screens 105a, b to bypass or otherwise switch. This is compared to the second gesture mechanism defined as a switch mechanism between the currently displayed screen 105a,b and a previous (e.g. historical) screen 105a,b, such that the manager 20,26,28 stores and keeps track of which screen 105a,b was configured on the user interface 104 prior (e.g. immediately) to the currently displayed display screen 105a,b.

Example of Mobile Device 10

Figure 12:
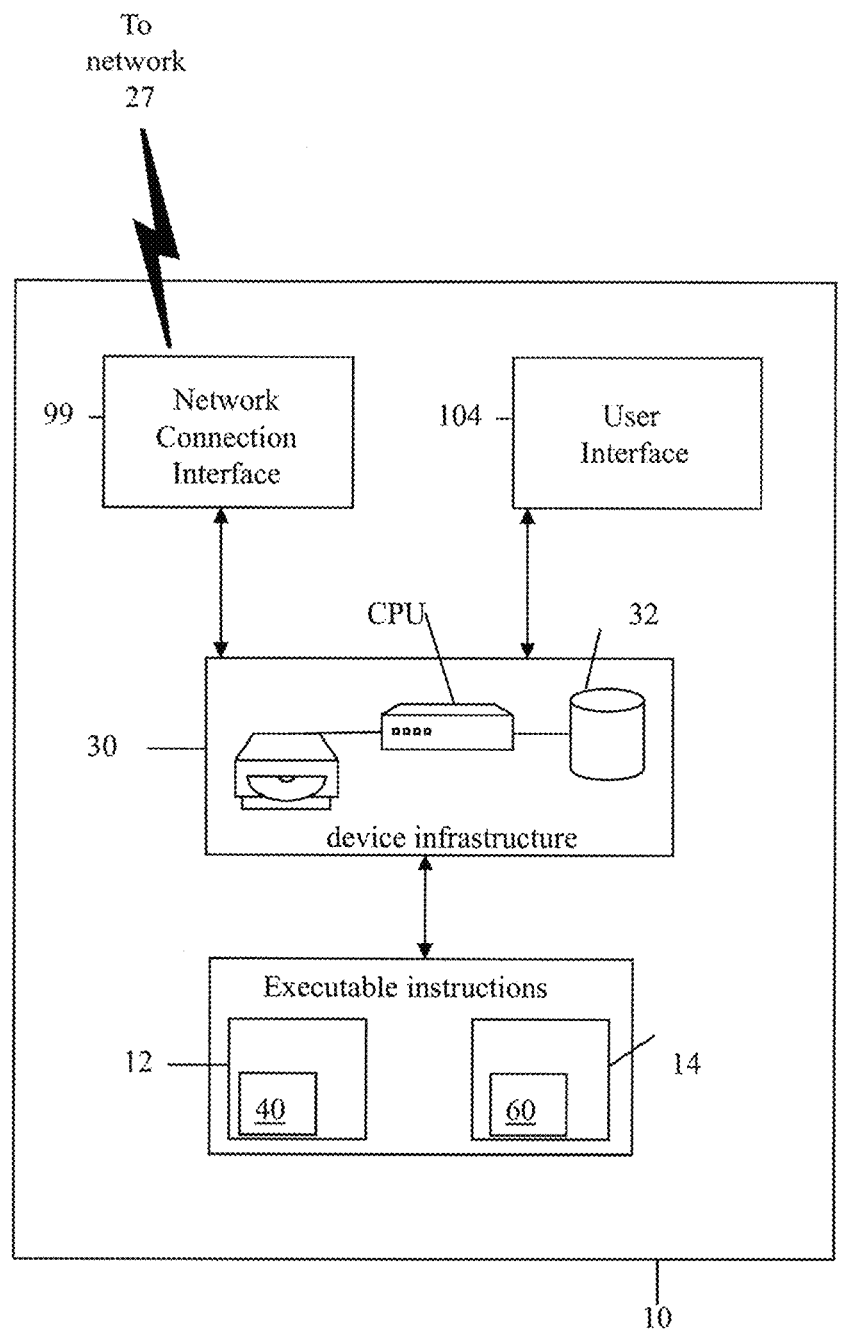
FIG. 12 shows an example configuration of a device of the system of FIG. 1.

Referring to FIG. 12, a computing device 10 implementing functionality of the multi-environment can include a network connection interface 99, such as a network interface card or a modem, coupled via connection to a device infrastructure 30. The connection interface 99 is connectable during operation of the devices to the network 27 (e.g. an intranet and/or an extranet such as the Internet), which enables networked devices to communicate with each other as appropriate. The network 27 can support the communication of the applications 40, 60 provisioned in the environments 12, 14, and the related content.

Referring again to FIG. 12, the device 10 can also have the user interface 104, coupled to the device infrastructure 30, to interact with a user. The user interface 104 can include one or more user input devices such as but not limited to a QWERTY keyboard, a keypad, a stylus, a mouse, a microphone and the user input/output device such as an LCD screen display and/or a speaker. If the screen is touch sensitive, then the display can also be used as the user input device as controlled by the device infrastructure 30.

Referring again to FIG. 12, operation of the device 10 is facilitated by the device infrastructure 30. The device infrastructure 30 includes one or more computer processors CPU and can include an associated memory 32. The computer processor CPU facilitates performance of the device 10 configured for the intended task (e.g. of the respective module(s)) through operation of the network interface 99, the user interface 104 and other application programs/hardware 40, 60 of the device 10 by executing task related instructions. These task related instructions can be provided by an operating system, and/or software applications located in the memory 32, and/or by operability that is configured into the electronic/digital circuitry of the processor(s) CPU designed to perform the specific task(s). Further, it is recognized that the device infrastructure 30 can include a computer readable storage medium coupled to the processor CPU for providing instructions to the processor CPU and/or to load/update the instructions (e.g. applications 40, 60). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 10 can include the executable applications comprising code or machine readable instructions for implementing predetermined functions/operations including those of an operating system and the modules, for example. The processor CPU as used herein is a configured device and/or set of machine-readable instructions for performing operations as described by example above, including those operations as performed by any or all of the modules. As used herein, the processor CPU may comprise any one or combination of, hardware, firmware, and/or software. The processor CPU acts upon information by manipulating, analyzing, modifying, converting or transmitting information for use by an executable procedure or an information device, and/or by routing the information with respect to an output device. The processor CPU may use or comprise the capabilities of a controller or microprocessor, for example. Accordingly, any of the functionality of the modules may be implemented in hardware, software or a combination of both. Accordingly, the use of a processor CPU as a device and/or as a set of machine-readable instructions is referred to generically as a processor/module for sake of simplicity.

Preferably, the communications network 27 comprises a wide area network such as the Internet, however the network 27 may also comprise one or more local area networks 27, one or more wide area networks, or a combination thereof. Further, the network 27 need not be a land-based network, but instead may comprise a wireless network and/or a hybrid of a land-based network and a wireless network for enhanced communications flexibility. The communications network 27 is used to facilitate network interaction between the devices 10 and the servers 37. In terms of communications on the network 27, these communications can be between the computer devices (e.g. device 10 and device 37) consisting of addressable network packages following a network communication protocol (e.g. TCPIP), such that the communications can include compliance characteristic data communicated using appropriate predefined encryption as used between the device infrastructure 30 and the secure enterprise mobile services gateway or server.

What is claimed is:
1. A mobile device, comprising:
  a memory comprising computer program code;
  a network interface; and
  a processor in data communication with the memory and the network interface, and configured to execute the computer program code and cause the mobile device to:
    implement a mobile device operating system;
    implement a first application in a first application environment of the mobile device operating system, wherein the first application environment is configured to be selectively displayed via a mobile device graphical user interface, wherein the first application performs a functionality in the first application environment;
    implement a second application in a second application environment of the mobile device operating system, wherein the second application environment is configured to be selectively displayed via the mobile device graphical user interface, wherein the second application performs the same functionality as the first application in the second application environment;

receive, via the network interface, data comprising content associated with the first application while the second application environment is displayed on the mobile device;

determine that the second application performs the same functionality as the first application in the second application environment;

in response to the determination, send notification data regarding the received data associated with the first application to the second application in the second application environment, wherein the notification data provides an indication that the data associated with the first application has been received; and display the notification data in the second application environment.

2. The mobile device of claim 1, wherein the notification data includes a date and time of that the data comprising content associated with the first application was received.

3. The mobile device of claim 1, wherein the first application and the second applications are email applications, and the data comprising content associated with the first application is an email.

4. The mobile device of claim 1, wherein the first application environment is a work environment and the second application environment is a personal environment.

5. The mobile device of claim 1, wherein the processor is further configured to cause the mobile device to:
receive a command to switch from the second application environment to the first application environment; and
receive a password for the first application environment in order to enable the first application environment,
wherein the password for the first application environment is different from a password for the second application environment.

6. The mobile device of claim 5, wherein the processor is further configured to cause the mobile device to: display the content associated with the first application in the first application environment.

7. A method, comprising:
implementing a mobile device operating system;
implementing a first application in a first application environment of the mobile device operating system, wherein the first application environment is configured to be selectively displayed via a mobile device graphical user interface, wherein the first application performs a functionality in the first application environment;
implementing a second application in a second application environment of the mobile device operating system, wherein the second application environment is configured to be selectively displayed via the mobile device graphical user interface, wherein the second application performs the same functionality as the first application in the second application environment;
receiving, via the network interface, data comprising content associated with the first application while the second application environment is displayed on the mobile device;
determining that the second application performs the same functionality as the first application in the second application environment;
in response to the determination, sending notification data regarding the received data associated with the first application to the second application in the second application environment, wherein the notification data provides an indication that the data associated with the first application has been received; and displaying the notification data in the second application environment.

8. The method of claim 7, wherein the notification data includes a date and time of that the data comprising content associated with the first application was received.

9. The method of claim 7, wherein the first application and the second applications are email applications, and the data comprising content associated with the first application is an email.

10. The method of claim 7, wherein the first application environment is a work environment and the second application environment is a personal environment.

11. The method of claim 7, further comprising:
receiving a command to switch from the second application environment to the first application environment; and
receiving a password for the first environment in order to enable the first application environment,
wherein the password for the first environment is different from a password for the second application environment.

12. The method of claim 11, further comprising: displaying the content associated with the first application in the first application environment.

13. A mobile device, comprising:
a memory comprising computer program code; a network interface; and
a processor in data communication with the memory and the network interface, and configured to execute the computer program code and cause the mobile device to:
implement a mobile device operating system;
implement a first application in a first application environment of the mobile device operating system, wherein the first application environment is configured to be selectively displayed via a mobile device graphical user interface, wherein the first application performs a functionality in the first application environment;
implement a second application in a second application environment of the mobile device operating system, wherein the second application environment is configured to be selectively displayed via the mobile device graphical user interface, wherein the second application performs the same functionality as the first application in the second application environment;
receive, via the network interface, data comprising content associated with the first application while the second application environment is displayed on the mobile device;
determine that the second application performs the same functionality as the first application in the second application environment;
in response to the determination, send notification data regarding the received data associated with the first application to a notification menu accessible in the second application environment, wherein the notification data provides an indication that the data associated with the first application has been received; and
display the notification data in the notification menu of the second application environment.

14. The mobile device of claim 13, wherein the notification data includes a date and time of that the data comprising content associated with the first application was received.

15. The mobile device of claim 13, wherein the first application and the second applications are email applications, and the data comprising content associated with the first application is an email.

16. The mobile device of claim 15, wherein the notification data does not include at least a portion of a body of the received email.

* * * * *